(12) United States Patent
Khomenko et al.

(10) Patent No.: US 10,670,389 B2
(45) Date of Patent: Jun. 2, 2020

(54) SENSITIVE OPTICAL FIBER SHAPE SENSING BASED ON SHAPE-RELATED OPTICAL POLARIZATION EVOLUTION

(71) Applicant: General Photonics Corporation, Chino, CA (US)

(72) Inventors: Anton Khomenko, Ontario, CA (US); Xiaotian Steve Yao, Diamond Bar, CA (US); Xiaojun James Chen, San Gabriel, CA (US)

(73) Assignee: General Photonics Corporation, Chino, CA (US)

( * ) Notice: Subject to any disclaimer, the term of this patent is extended or adjusted under 35 U.S.C. 154(b) by 0 days.

(21) Appl. No.: 15/902,998

(22) Filed: Feb. 22, 2018

(65) Prior Publication Data

US 2018/0238680 A1 Aug. 23, 2018

Related U.S. Application Data

(60) Provisional application No. 62/462,868, filed on Feb. 23, 2017.

(51) Int. Cl.
| | |
|---|---|
| *G01B 9/02* | (2006.01) |
| *G01B 11/24* | (2006.01) |
| *G01M 11/00* | (2006.01) |
| *G01M 11/08* | (2006.01) |

(52) U.S. Cl.
CPC ....... *G01B 11/2441* (2013.01); *G01M 11/088* (2013.01); *G01M 11/3136* (2013.01); *G01M 11/3172* (2013.01)

(58) Field of Classification Search
CPC ............ G01B 11/2441; G01B 9/02072; G01B 2290/70; G01M 11/088; G01M 11/3136; G01M 11/3172; G01M 11/083; G01M 11/085
See application file for complete search history.

(56) References Cited

U.S. PATENT DOCUMENTS

| | | | | |
|---|---|---|---|---|
| 9,632,006 | B2* | 4/2017 | Chen | ............... G01M 11/3127 |
| 2010/0158433 | A1* | 6/2010 | Askins | ............... G01M 11/088 |
| | | | | 385/13 |
| 2011/0109898 | A1* | 5/2011 | Froggatt | ............... G01M 11/31 |
| | | | | 356/73.1 |
| 2011/0320147 | A1* | 12/2011 | Brady | ............... G01H 9/004 |
| | | | | 702/66 |
| 2016/0123837 | A1* | 5/2016 | Chen | ............... G01M 11/088 |
| | | | | 356/73.1 |
| 2016/0146699 | A1* | 5/2016 | Lally | ............... G01K 11/32 |
| | | | | 356/73.1 |
| 2017/0052091 | A1* | 2/2017 | Mori | ............... G01M 11/088 |
| 2017/0307475 | A1* | 10/2017 | Eyal | ............... H04B 10/071 |
| 2017/0370704 | A1* | 12/2017 | Froggatt | ............... G01L 1/242 |
| 2018/0263709 | A1* | 9/2018 | 'T Hooft | ............... G01L 1/246 |
| 2019/0094459 | A1* | 3/2019 | Froggatt | ............... G02B 6/02 |

FOREIGN PATENT DOCUMENTS

WO    WO-2014201057 A2 * 12/2014    ......... G01M 11/088

* cited by examiner

*Primary Examiner* — Tarifur R Chowdhury
*Assistant Examiner* — Jonathon Cook
(74) *Attorney, Agent, or Firm* — Nixon & Vanderhye P.C.

(57) ABSTRACT

This patent document discloses fiber sensing techniques and devices for shape monitoring by using single- and multi-core optical fiber implementations and optical interferometry. Implementations can be made based on coherent optical time domain reflectometry (OTDR) or optical frequency domain reflectometry (OFDR).

20 Claims, 17 Drawing Sheets

SENSITIVE OPTICAL FIBER SHAPE SENSING BASED ON SHAPE-RELATED OPTICAL POLARIZATION EVOLUTION

CROSS-REFERENCE TO RELATED APPLICATION(S)

This reference claims the benefits of and the priority to U.S. Provisional Application No. 62/462,868, entitled "SENSITIVE OPTICAL FIBER SHAPE SENSING BASED ON SHAPE-RELATED OPTICAL POLARIZATION EVOLUTION" and filed Feb. 23, 2017, which is hereby incorporated by reference as part of this patent document for all purposes.

TECHNICAL FIELD

This patent document relates to optical sensing techniques and devices by using optical fiber as sensors.

BACKGROUND

Optical fiber can be used as optical sensors to perform various sensor operations, e.g., using optical fiber sensing for structural health monitoring in aerospace, automotive, civil engineering structure monitoring, undersea oil exploration, biomechanics, and biomedical areas. Optical fiber sensors can be configured to achieve one or more advantages, including, e.g. small size, light weight, ease of implementation, high accuracy, biocompatibility, chemical inertness, multiplexing capability, and immunity to electromagnetic interference.

SUMMARY

This patent document discloses fiber sensing techniques and devices for shape monitoring by using single- and multi-core optical fiber implementations and optical interferometry. Implementations can be made based on coherent optical time domain reflectometry (OTDR) or optical frequency domain reflectometry (OFDR).

In one aspect, the disclosed technology can be implemented to provide a method for monitoring a shape by using a fiber sensor having different fiber cores that are displaced from one another for shape sensing. One implementation of this method includes directing probe light into the different fiber cores in the multi-core fiber sensor to produce returned probe light from each of the different fiber cores of the multi-core fiber sensor; directing the returned probe light from each of the different fiber cores of the multi-core fiber sensor into an optical interferometer to produce an optical output for a corresponding fiber core in the multi-core fiber sensor; operating an optical detector to convert the optical output from the optical interferometer into an electrical signal that carries information on a local shape change at a corresponding fiber core in the multi-core fiber sensor; and processing the electrical signals for different corresponding fiber cores in the multi-core fiber sensor to monitor a shape-related optical polarization evolution in the returned probe light from each fiber core of the multi-core fiber sensor to determine the shape change from the electrical signals for different corresponding fiber cores in the multi-core fiber sensor.

In another aspect, the disclosed technology can be implemented to provide an optical fiber sensor for shape sensing. One implementation of such a sensor includes a probe light source to produce probe light; different fiber cores that are displaced from one another and are engaged to an object to optically sense a shape change in the object that is experienced by the different fiber cores; an optical light coupling module configured to receive the probe light from the probe light source and to direct the probe light into the single-core sensor or different fiber cores in the multi-core fiber sensor to produce returned probe light from the different fiber cores of the multi-core fiber sensor; an optical interferometer coupled to receive the returned probe light from each of the different fiber cores of the multi-core fiber sensor to produce an optical output for a corresponding fiber core in the multi-core fiber sensor; an optical detector coupled to receive output light from the optical interferometer and operable to convert the optical output from the optical interferometer into an electrical signal that carries information on a local change shape experienced at a corresponding fiber core in the multi-core fiber sensor; and a sensor processor coupled to receive the electrical signals for different corresponding fiber cores in the multi-core fiber sensor from the optical detector, the sensor processor configured to process the electrical signals to monitor a shape-related optical polarization evolution in the returned probe light from each fiber core of the multi-core fiber sensor to determine the shape change from the electrical signals for different corresponding fiber cores in the multi-core fiber sensor.

In yet another aspect, the disclosed technology can be implemented to provide an optical fiber sensor for shape sensing. One implementation of such a sensor includes a probe light source to produce probe light; a fiber having a fiber core and engaged to an object to optically sense a shape change in the object that is experienced by the fiber core; an optical light coupling module configured to receive the probe light from the probe light source and to direct the probe light into the fiber core to produce returned probe light from the fiber core; an optical interferometer coupled to receive the returned probe light from the fiber core to produce an optical output; an optical detector coupled to receive output light from the optical interferometer and operable to convert the optical output from the optical interferometer into an electrical signal that carries information associated with the shape change at the fiber core; and a sensor processor coupled to receive the electrical signal from the optical detector, the sensor processor configured to process the electrical signal to monitor a shape-related optical polarization evolution in the returned probe light from the fiber core to determine the shape change.

The above and other aspects of the disclosed technology and their implementations are described in greater detail in the drawings, the description and the claims.

DETAILED DESCRIPTION

Figure 1:
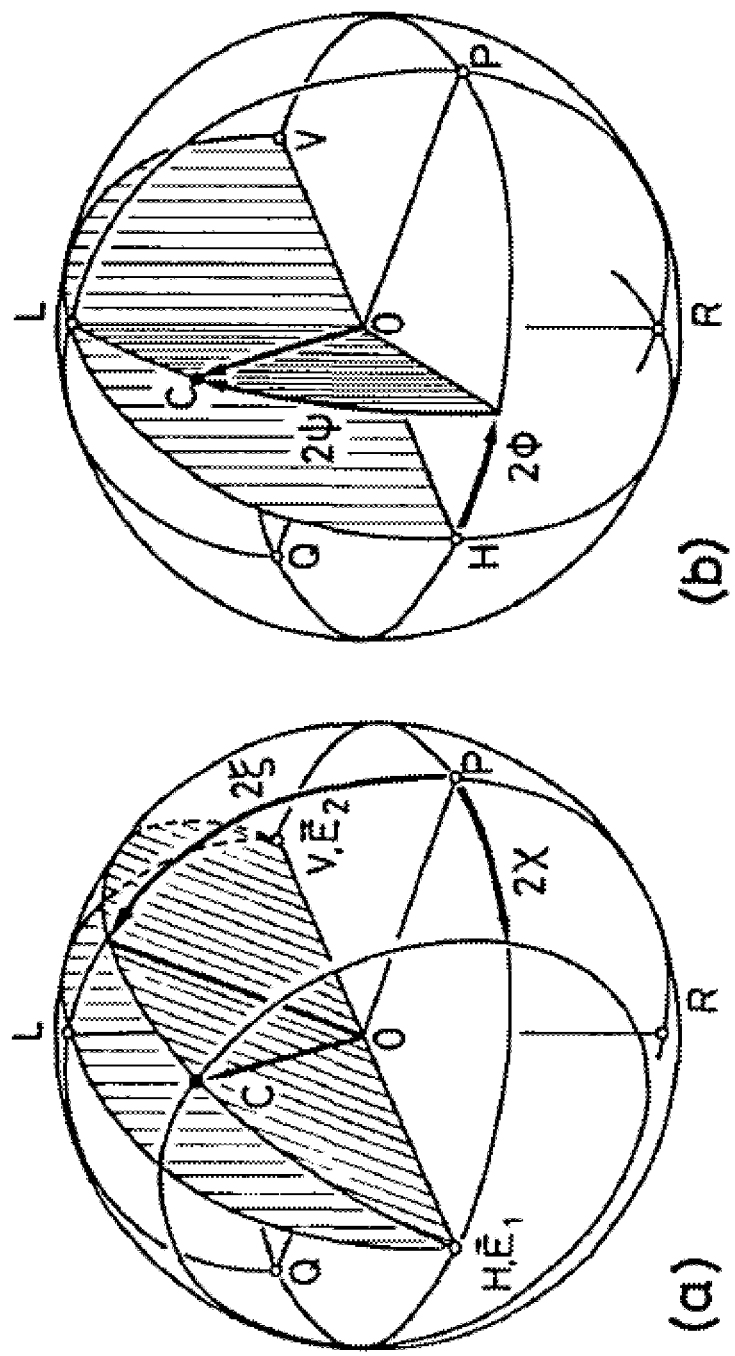
FIG. 1 shows a general state of polarization on a Poincare sphere where the Poincare sphere in (a) is marked to show horizontal (H) and vertical (V) linear polarizations and the Poincare sphere in (b) is marked to show right-hand (R) and left-hand (L) circular polarizations.

This patent document provides fiber sensing techniques and devices for shape sensing by monitoring shape-related optical polarization evolution. The disclosed fiber shape sensing is based on using single-core or multi-core optical fibers to obtain local 3D strains and bending by measuring polarization of returned probe light from each sensing fiber core. When fiber is illuminated by light, the light is scattered by the material in the fiber via various scattering effects including the Raleigh scattering. A portion of the scattered light is directed backward in an opposite direction of the illumination light and includes back reflection of the incident probe light and the backward scattered light of the incident probe light. This returned light in fiber can be used as a probe for sensing the shape change in the fiber and the evolution of the state of polarization (SOP) of such returned light can be measured to extract the information on the shape change based on optical reflectometry. The disclosed fiber shape sensing is different from various fiber Bragg grating (FBG)-based and OFDR-based strain shape sensing techniques and can be, in various implementations, advantageous over certain FBG-based and OFDR-based strain shape sensing techniques.

The fiber shape sensing technology disclosed in this document can be used to construct single- and multi-core shape sensors for various applications that need shape sensing including sensing and monitoring shapes of structures and devices, e.g., shapes of medical devices like endoscopes and catheter devices and shapes of aircraft and other vehicles.

Polarization Evolution in Optical Fibers

When electromagnetic radiation propagates through an unbounded anisotropic medium, two normal propagation modes are possible and each normal mode possesses the characteristic of propagating without change of form, and in particular, without change of polarization state. These two normal modes are, in general, elliptically polarized, each with the same ellipticity but with their major axes orthogonal. The electric vectors of such two modes rotate in opposite directions and have different propagation velocities. To a first approximation, these modes may be considered to be elliptically polarized transverse modes. When light of an arbitrary initial polarization state passes through the medium, the change in polarization state which occurs as a result can be deduced by resolving the initial state into two normal mode components and recombining them on emergence from the medium, after making allowance for the relative phase shift which will have occurred as a result of the velocity difference between them.

In a circular cross-section monomode or single mode optical fiber, the two normal modes are degenerate and maybe considered to be any two orthogonal linearly polarized states or any two orthogonal linear combinations of the two states. A departure in the geometry which introduces asymmetry into the structure may lift this degeneracy. For example, noncircularity of core cross section will result in two normal modes which are still linearly polarized and orthogonal but which now travel at different velocities. The effect is thus to endow the fiber with two different refractive indices for the two linearly polarized modes, and it is said to exhibit linear birefringence. It will consequently act as a linear retarder. A spirality in the core structure can lead to two normal modes which are (to a good approximation) circularly polarized in opposite directions, and such modes have differing velocities. The fiber acts as a linear polarization rotator and is said to exhibit circular birefringence. Both types of birefringence may be present, and the normal modes can be elliptically polarized.

The influence of the fiber twist is intimately linked with the influence of the linear birefringence that exists in fiber due to deviations from a circular shape of its core or due to internal stress. Three typical situations may be distinguished, depending on the relative magnitudes of the twist rate γ (a positive γ denotes a right-handed twist) and the linear birefringence $\beta_L$. In the case of a weak fiber twist in which $|\gamma|<<|\beta_L|$, the mentioned linear birefringence is the dominant effect. Its principal axes are rotated by the twist. Referring to these axes, the polarization evolves essentially identically as it would do in the nontwisted fiber. Thus, the polarization is simply twisted with the fiber. At a medium twist in which $|\gamma|\approx|\beta_L|$, the shear strain in the twisted fiber gives rise to a circular birefringence a proportional to the twist, $\beta_C \sim \gamma \cdot g$, where g is the rotation coefficient. In combination with the linear birefringence, elliptical birefringence results and causes a rather complicated evolution of the polarization. At a strong twist in which $|\gamma|>>|\beta_L|$, the evolution is dominated by the induced circular birefringence $\beta_C$.

In the ideal fiber, the electric and magnetic fields of a mode m have the general form $A_m(z) \cdot \vec{E}_m(x, y)$ and $A_m(z) \cdot \vec{H}_m(x, y)$, respectively:

$$A_m(z) = a_m \cdot e^{i k_m z} \quad (1)$$

where x and y are the orthogonal axes in-plane of the fiber cross-section, z is an axis along the fiber length, a monochromatic time dependence $e^{-i \vec{k} \cdot c \cdot t}$ of all field quantities is tacitly assumed, $k=2\cdot\pi/\lambda$, λ is the wavelength in the vacuum.

In imperfect fiber its relative dielectric permeability has spatial distribution $\varepsilon=\varepsilon_0+\varepsilon_p$, where the imperfections of the fiber are contained in the perturbation $\varepsilon_p(x,y,z)$. The fields in the imperfect fiber are represented as superposition of the modes of the ideal fiber. The transverse field distributions $\vec{E}^t(x,y)$ of the latter form a complete orthogonal set of functions, suitable to express the general transverse electric field in the imperfect fiber in any given plane z=const as:

$$\vec{E}^t(x, y, z) = \sum_m A_m(z) \cdot \vec{E}^t_m(x, y) \quad (2)$$

where the symbol m and the summation include the discrete, guided modes as well as the continuum of radiation modes. The transverse component of a field vector is denoted by the superscript t, the longitudinal one by a superscript l.

In an ideal fiber, the evolution of the mode amplitudes $A_m(z)$ is determined by Eq. 1 with constant $a_m$. In the imperfect fiber, the evolution of the $A_m(z)$ is more complicated because the perturbation $\varepsilon_p$ modifies and couples the ideal modes. The general form (Eq. 1) of the $A_m(z)$ may be maintained if $a_m$ is permitted to vary along the fiber, $a_m = a_m(z)$. Then, the wave equation in the perturbed fiber reduces to a set of coupled-mode equations for the $a_m(z)$:

$$a'_m(z) = i \cdot \Sigma \kappa_{mn} \cdot a_n(z) \cdot e^{i \cdot (k_n - k_m) \cdot z}, \quad (3)$$

where the prime ' indicates the derivative with respect to z. The coupling coefficients $\kappa_{mn}$ depend on the perturbation $\varepsilon_p$. A single mode fiber (SMF) can support two guided modes of orthogonal polarizations. Their propagation constants are real and degenerate ($k_1 = k_2$) in the ideal fiber if the absorption is assumed to be sufficiently small and thus can be neglected. The losses which may result from coupling to the radiative modes are also ignored. Even if those modes should become excited, their power is lost continuously from the core region. Therefore, the general electric field in an imperfect SMF can be represented by the superposition of the two guided modes only:

$$\vec{E}(x,y,z) = [a_1(z) \cdot \vec{E}_1(x,y) + a_2(z) \cdot \vec{E}_2(x,y)] \cdot e^{i \cdot k_1 \cdot z} \quad (4)$$

In a weakly guiding fiber which is present in many practical applications, the coupling coefficients can be expressed as follows based on the perturbation theory:

$$\kappa_{mn} = (I_{mn}^{(1)} + I_{mn}^{(2)} + I_{mn}^{(3)})/Q_m \quad (5)$$

$$I_{mn}^{(1)} + I_{mn}^{(2)} = k \cdot k_1 \cdot \iint \vec{E}^*_m \cdot (\varepsilon_p \cdot \vec{E}_n) \cdot dx \cdot dy \quad (6)$$

$$I_{mn}^{(3)} = -i \cdot k \cdot \iint \vec{E}_m^{l*} \cdot \nabla(\varepsilon_p \cdot \vec{E}_n) \cdot dx \cdot dy \quad (7)$$

$$Q_1 = Q_2 = 4 \cdot \pi \cdot n_0 \cdot k_1 \cdot \int J^2 \cdot r \cdot dr, \quad (8)$$

where asterisk * indicates complex conjugation, J(r) is the radial wave function of the fiber, and $n_0 \approx \sqrt{\varepsilon_0}$ is a mean refractive index of the fiber.

In the electric field $\vec{E}_n$ of a mode, $\varepsilon_p$ produces an extra dielectric polarization ($\varepsilon_p \cdot \vec{E}_n$) which then couples to the same or another mode according to the overlap with $\vec{E}_m$ expressed by the integral in Eq. (6). Similarly, the quantity $\nabla(\varepsilon_p \cdot \vec{E}_n)$ in Eq. (7) may be interpreted as a fictitious space charge produced by $\varepsilon_p$, coupling only to the longitudinal component $\vec{E}_m^l$.

In the coupled-wave equations (Eq. (3)), the diagonal coefficients $\kappa_{11}$ and $\kappa_{22}$ describe a detuning of the two previously degenerate modes. If $\kappa_{11} \neq \kappa_{22}$, the degeneracy of their propagation constants is lifted and the modes show a spatial beating effect with their spatial difference frequency ($\kappa_{11} - \kappa_{22}$). The off-diagonal coefficients $\kappa_{12}$ and $\kappa_{21}$ describe the mutual coupling of the modes, resulting in an interchange of power. If the fiber is assumed to be lossless, the following condition $\kappa_{12} = \kappa_{21}^*$ holds. The beating and the coupling effects exist simultaneously, leading to the coupled-mode propagation.

State of Polarization Evolution Representation

In a SMF, a local polarization can be distinguished from a global distribution of polarization. At each point (x,y,z) in the fiber, the electric field (Eq. (4)) has a specific local polarization. Generally, this field has a longitudinal component also and varies within a given cross section z=const. The variation is determined by the modal wave functions $\vec{E}_m(x, y)$ if their amplitudes $a_1$ and $a_2$ are specified. Because the total power ($|a_1|^2 + |a_2|^2$) and the common phase of the two modes are irrelevant for polarization, it is sufficient to specify only the ratio $a_1/a_2$ in a given cross-sectional plane to characterize there the distribution of local polarization. The global distribution of polarization, on the other hand, is described then by the z dependence of the ratio $a_1(z)/a_2(z)$. This global evolution of polarization along the fiber is affected by the various birefringence effects. An important aspect of the global evolution is that it is deterministic if the light is strictly monochromatic and the fiber is at rest. If, in that case, $a_1(z)/a_2(z)$ has a certain, constant value at one point along a given fiber (e.g., at the input), it is fully determined at all other points of the fiber, too, and does not vary in time. This is because the solution of Maxwell's equations is determined by specifying fixed initial and boundary conditions. Therefore, the imperfect SMF does not depolarize strictly monochromatic light but rather alters the state of polarization along the fiber (not the degree of polarization). For polarized light of a finite spectral bandwidth, the correlation between the two modes may decrease along the imperfect fiber because of the nondegenerate propagation constants, so that the light becomes depolarized. Depolarization may also occur by thermal or rapid mechanical fluctuations of the fiber properties.

Figure 2:
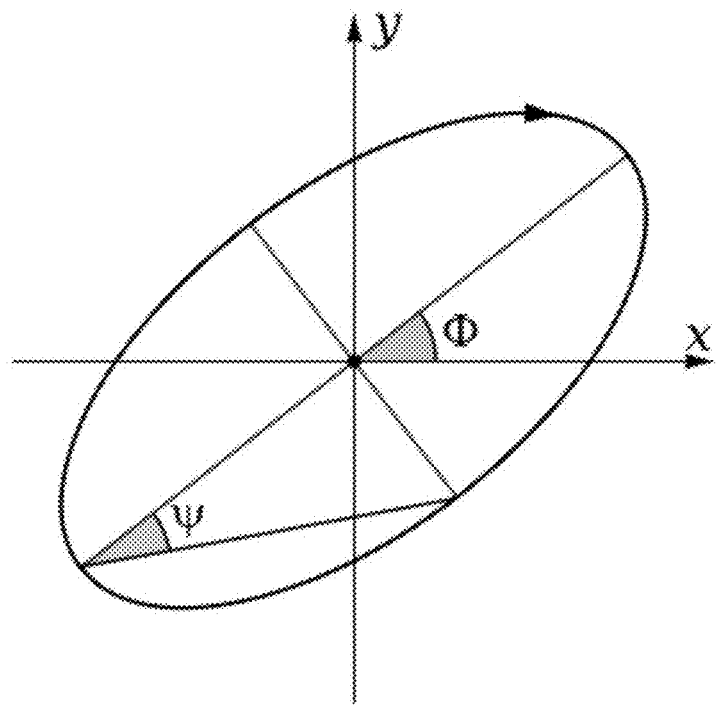
FIG. 2 shows an example of a polarization ellipse corresponding to FIG. 1(b).

Referring to FIGS. 1 and 2, for each cross section z the ratio $a_1(z)/a_2(z)$ can be represented by a point C(z) or by the vector $\vec{C}(z) = OC$ on a generalized Poincare sphere S of a unit radius (FIG. 1). FIG. 2 shows a polarization ellipse corresponding to FIG. 1(b).

Referring to FIG. 1, the angular coordinates of C(z) are:

$$2 \cdot \chi = \arctan[(|a_1/a_2| - 1)/(|a_1/a_2| + 1)];$$

$$2 \cdot \Phi = \text{arccot}[(|a_1/a_2| - 1)/(|a_1/a_2| + 1)];$$

$$2 \cdot \xi = 2 \cdot \Psi = \arg(a_1/a_2). \quad (9)$$

This representation has been chosen so that it becomes identical with the conventional Poincare representation of polarization in the limit of a large core diameter. In that limit, the z components of the wave functions $\vec{E}_m(x, y)$ vanish, and these functions approach plane waves of uniform local polarization, representable in the usual way. In that sense, then, any global SOP with real $a_1/a_2$ is called a linear state and corresponds to a point C on the equator of the sphere S. Points H and V correspond to horizontal and vertical polarizations, while P and Q correspond to linear SOPs of +45° and −45° azimuth, respectively. The poles R and L of the spheres S represent circular polarizations, with the electric vector rotating clockwise or counterclockwise, respectively, when looking toward the source.

The evolution of any initial SOP along the fiber can be represented by a trajectory $\vec{C}(z)$ on S. The local velocity and the direction of evolution, $\vec{C}' = d\vec{C}/dz$, are governed by the coupled wave equations (Eqs. (3)). In order to find the evolution of polarization over a longer piece of fiber, these equations can be integrated. The representation on the Poincare sphere is well suited for this integration, because in the two-mode case, Eqs. (4) describe simply a rotation of the sphere S with a certain angular velocity ω(z) [16]:

$$\vec{C}' = \vec{\omega}(z) \times \vec{C}(z) \quad (10)$$

$$\omega = |\vec{\omega}| = \sqrt{(\kappa_{11} - \kappa_{22})^2 + 4 \cdot \kappa_{12} \cdot \kappa_{21}} \quad (11)$$

$$2 \cdot \Phi_\omega = \text{arccot}[(\kappa_{11} - \kappa_{22})/\sqrt{4 \cdot \kappa_{12} \cdot \kappa_{21}}] \quad (12a)$$

$$2 \cdot \Psi_\omega = \arg(\kappa_{12}) \quad (12b)$$

Thus, an infinitesimal length dz of fiber rotates all SOPs about the direction $\vec{\omega}$ through an angle $\omega \cdot dz$. Eqs. (12) express the spherical coordinates of the direction $\vec{\omega}(z)$ in terms of the coupling coefficients $\kappa_{mn}(z)$. Therefore, $\vec{\omega}(z)$ is known, in principle, for all points along the fiber. It is possible then to construct for any given input SOP the trajectory $\vec{C}(z)$ on S. This geometrical construction of $\vec{C}(z)$ as a succession of rotations permits a clear insight into the various polarization effects. This construction is particularly convenient if $\vec{\omega}(z)$ is constant or varies systematically along the fiber.

Bending: Linear Birefringence

Figure 3:
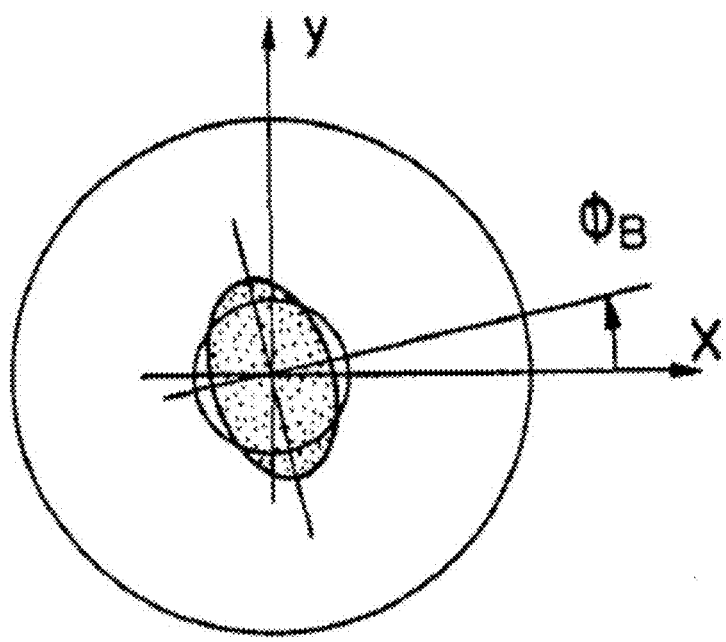
FIG. 3 illustrates an example of an optical birefringent fiber due to an elliptically deformed core.

In real fibers, the cross section of the core is often not perfectly round. One of the deviations is an elliptical deformation of the index profile due to the stress. If a relative compression $\eta$ of the profile $\varepsilon_0(r)$ along the azimuthal direction $\Phi_B$ and a corresponding dilatation in the orthogonal direction are considered (see FIG. 3), the resulting perturbation is scalar, and couples only the $\vec{E}_m^l$ components by Eqs. (6) and (7).

Because these $\vec{E}_m^l$ are in phase, the $\kappa_{mn}$ turn out real, causing linear birefringence [16]:

$$\kappa_{11} = -\kappa_{22} = (\beta_L/2) \cdot \cos(2 \cdot \Phi_B); \kappa_{12} = \kappa_{21} = (\beta_L/2) \cdot \sin(2 \cdot \Phi_B) \quad (13)$$

The quantity $\beta_L$ introduced here is proportional to r and contains certain integrals over $\varepsilon_0(r)$. The deformation causes maximum detuning and beating of the modes when its axes are parallel to the polarizations $\dot{E}_1$ and $\dot{E}_2$. When the axes lie at 45° to these polarizations, there is no detuning, but maximum coupling.

Figure 4:
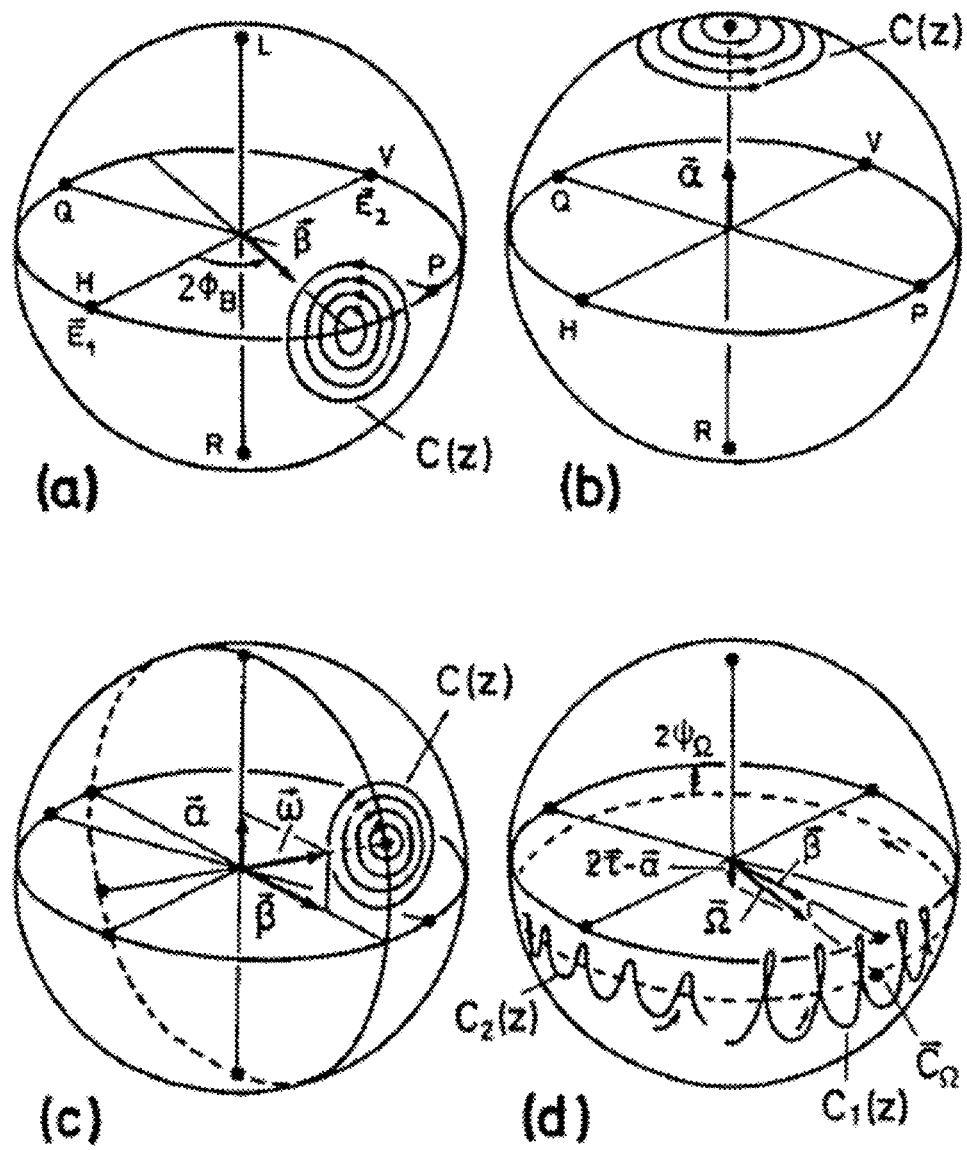
FIG. 4 shows four examples of polarization states and evolution of polarization for various kinds of birefringence. (a) linear birefringence; (b) circular birefringence; (c) straight elliptical birefringence; (d) twisted elliptical birefringence.

When $\kappa_{12}$ is real, as, for example, in the case of a deformed core (Eqs. (13)), the axis of rotation lies in the equatorial plane according to Eqs. (12(b)). This rotation characterizes linear birefringence and can be denoted by a vector $\vec{\beta}_L$. Its magnitude $|\vec{\beta}_L|$ is identical with the $\beta_L$ defined earlier in Eqs. (13). In more conventional coordinate system of FIG. 1(b), the vector $\vec{\beta}_L$ has simply the longitude $2 \cdot \Phi_B$. When a fiber of length L has only linear birefringence $\beta_L$, a general input state $\vec{C}(0)$ is rotated through the angle $\beta_L \cdot L$ about $\vec{\beta}_L$. Thus, all trajectories $\vec{C}(z)$ are circular arcs about $\vec{\beta}_L$, as indicated in FIG. 4(a).

Figure 5:
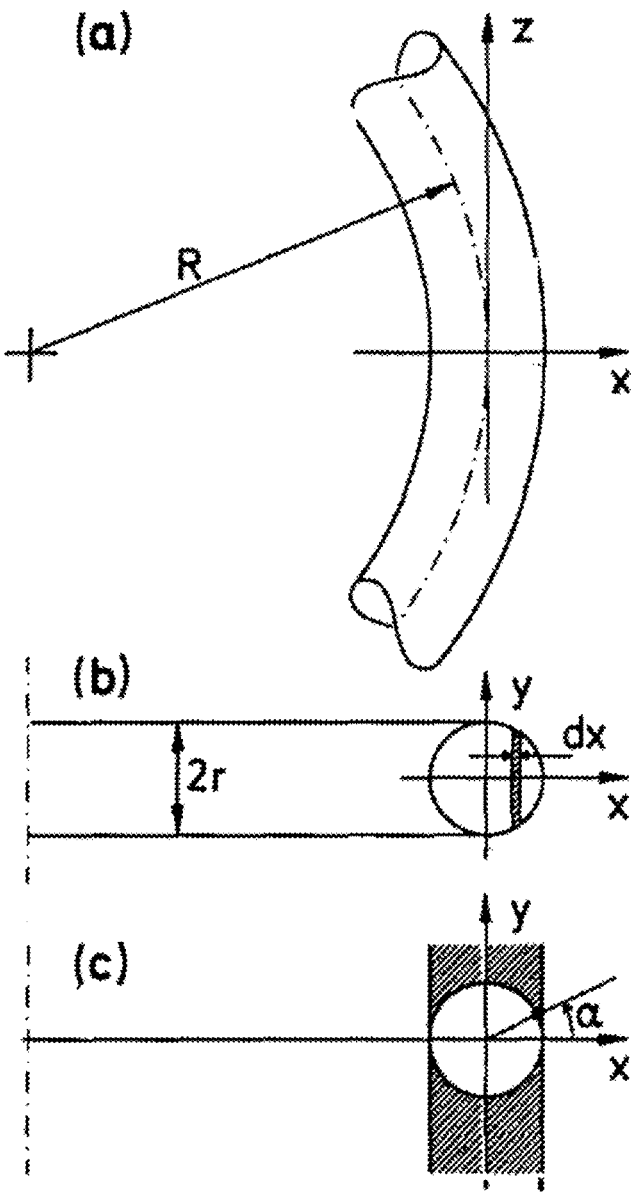
FIG. 5 shows an example of the geometry of a bent fiber segment.

Bending-induced birefringence is essentially a stress effect, which results from the lateral, compressive stress $-\sigma_x$ that builds up in a bent fiber under the conditions of "large" deformations. The well-known dominant stress component in a bent fiber (see FIG. 5) is $-\sigma_z = K \cdot \tilde{P} \cdot x$, where $K = 1/R$ is the curvature, R is the radius of curvature, and $\tilde{E}$ is Young's modulus.

Across the xy plane, $\sigma_z$ is a tensile stress in outer (x>0) layers, but $\sigma_z$ is compressive in all inner (x<0) layers. Consequently, the outer layers exert a pressure $-\sigma_x$ in the radial (R) direction on the inner layers. This pressure is highest on the fiber axis and causes the birefringence, much like the birefringence caused by an external lateral force. For a calculation of the lateral stress in the cross section z=0, the fiber can be postulated as elastically homogeneous and isotropic, and the limit of weak curvature K should be considered, $K \cdot r \ll 1$, where $2 \cdot r$ is the outer diameter of the fiber. In this case linear birefringence can be calculated as:

$$\beta_L = 0.25 \cdot k \cdot n_0^3 \cdot (p_{11} - p_{12}) \cdot (1 + v) \cdot K^2 \cdot r^2, \quad (14)$$

where $p_{ij}$ denote the strain-optical coefficients (e.g., $p_{11} - p_{12} = -0.15$ in fused silica), v is the Poisson's ratio (e.g., 0.17 for fused silica). The negative sign indicates that the fast axis of the bending birefringence coincides with the radius of curvature. The slow axis is normal to the plane of curvature. Hence, pure bending caused in a fiber segment $\Delta l$ will result in general input state $\vec{C}(0)$ rotation through the angle $\beta_L \cdot \Delta l$ ($2 \cdot \beta_L \cdot \Delta l$ in case of double-pass for reflectometry measurements) about $\vec{\beta}_L$ on Poincare sphere S (see FIG. 4(a)), where $\beta_L \sim K^2 = 1/R^2$.

Additionally, linear birefringence can be caused by geometrical effects [18, 19]. A noncircular core in a nominally round single-mode fiber can usually be well approximated by an elliptical cross section. This specific retardation $\beta_L^G$ is essentially constant, $$\beta_L^G = 0.13 \cdot \frac{e^2}{b} \cdot (2 \cdot \Delta_n)^{3/2},$$

where $e^2 = 1 - \frac{b^2}{a^2}$, b and a are the minor and major semiaxes of the core, and $\Delta_n$ is the relative index difference between core and cladding. It can be observed, that geometrical linear birefringence is independent of the light wavelength. Moreover, it is several orders of magnitude lower than the stress (bending)-induced linear birefringence.

Twist: Circular Birefringence

Figure 6:
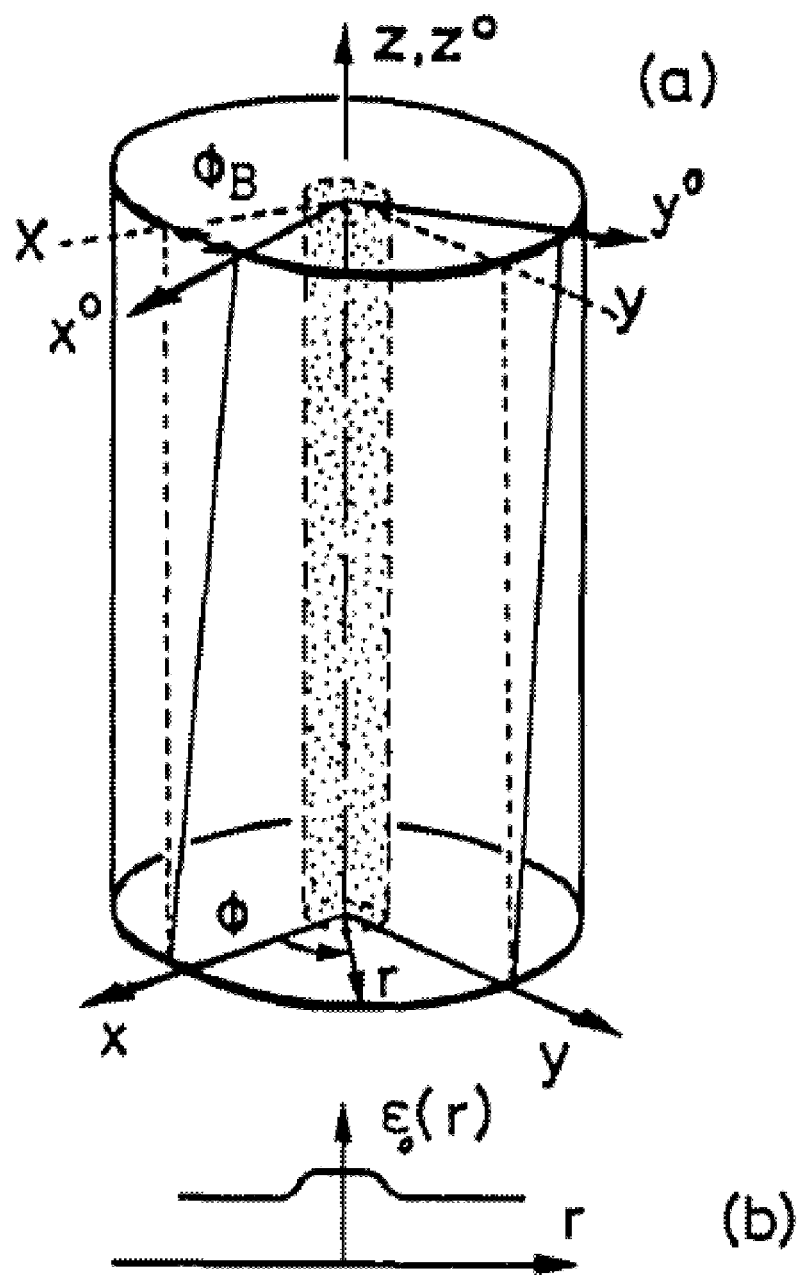
FIG. 6 shows an example of a twisted optical fiber in (a) which has a smooth radial distribution of the dielectric permeability shown in (b).

To calculate the coupling coefficients $\kappa_{mn}$ resulting from twist, it is assumed that the elastic properties and the elastooptic tensor $p_{rs}$ are uniform throughout the fiber. The twist causes a rotation $\Phi_B = \gamma \cdot z$ of the cross-sectional plane z (see FIG. 6(a)).

Evaluation of the elastic deformation field gives the strain tensor $e_{rs}$. Its only nonvanishing components cause changes $\Sigma p_{rs} e_s$ of the impermeability tensor, which may be converted to changes in the dielectric permeability, i.e., to the perturbation tensor $\varepsilon_p$. The influence of twist for weakly guiding fibers of arbitrary index profile can be represented as [16]:

$$\kappa_{11} = \kappa_{22} = 0; \kappa_{12} = -\kappa_{21} = -i \cdot n_0^2 \cdot p_{44} \cdot \gamma/2 \quad (15)$$

These coefficients cause circular birefringence (optical activity) due to the imaginary sign on $\kappa_{12}$ and $\kappa_{21}$ that is caused by the coupling between a longitudinal $\vec{E}_m^l$ and a transverse field component $\vec{E}_n^l$, which are $\pi/2$ out of phase. In deriving Eqs. (15) scalar variations $\varepsilon_p$ which may result from the twist are ignored. They detune both modes identically ($\kappa_{11} = \kappa_{22}$) but do not couple them, leaving the polarization unchanged.

Circular birefringence is characterized by an imaginary $\kappa_{12}$ in combination with $\kappa_{11} = \kappa_{22}$, as, for example, in a twisted fiber (Eqs. (15)). Here, the rotation vector $\vec{\omega}$ coincides with the polar axis RL of FIG. 1(b) and is called $\vec{\beta}_C$. The trajectories are parallel to the equator (see FIG. 4(b)). From Eqs. (11) and (12b), the angular velocity is $\beta_C = -i \cdot \kappa_{12}$. For a linear SOP, the plane of polarization rotates at the rate $\beta_C/2$ per unit length of the fiber. The sign of $\beta_C$ is defined as positive and $\vec{\beta}_C$ as pointing north, if the plane of polarization appears to rotate counterclockwise when looking in the direction to the source (l-rotatory activity).

In the twisted fiber, the strain-induced optical activity is proportional to the twist. According to Eqs. (15) [16]:

$$\beta_C = g \cdot \gamma, \quad (16)$$

with $g = -n_0^2 \cdot p_{44}$, which was experimentally found to be $\approx 0.146$. Hence, pure twist of a fiber segment $\Delta l$ will result in general input state $\vec{C}(0)$ shifted by $\beta_C \cdot \Delta l$ ($2 \cdot \beta_C \cdot \Delta l$ in case of double-pass for reflectometry measurements) parallel to the equator on Poincare sphere S (see FIG. 4(b)), where $\beta_C \sim \gamma$ with positive sign indicating l-rotatory activity.

Fibers with a noncircular core may have a twist of their core shape, $\beta_C^G$, frozen in without elastic stress during the preform deposition or drawing process in fabrication of the fibers. This $\beta_C^G$ represents a rotation of the azimuthal direction of the fast axis of linear birefringence caused by geometrical effects $\beta_L^G$, and thus does not contribute to the optical activity. Hence, it is desirable to calibrate out $\beta_C^G$ from the measurements.

Bending and Twist Combination: Elliptical Birefringence

Elliptical birefringence results from the superposition of linear and circular birefringence. Because the corresponding rotations $\vec{\beta}_L \cdot dz$ and $\vec{\beta}_C \cdot dz$ are infinitesimal, they commute and can simply be added vectorially. In a fiber having both linear birefringence (e.g., due to bending) and circular birefringence (due to twist), the resulting angular velocity is:

$$\vec{\omega}(z) = \vec{\beta}_L(z) + \vec{\beta}_C(z) \tag{17}$$

For the case where $\vec{\omega}$ does not depend on z, the trajectories are indicated in FIG. 4(c). Here, two eigenstates of elliptical polarizations exist, $+\vec{\omega}/\omega$, which propagate unchanged. The state $+\vec{\omega}/\omega$ propagates at a greater phase velocity than the state $-\vec{\omega}/\omega$. The azimuthal orientations of these eigenstates are those of $\vec{\beta}_L$, i.e., they coincide with the symmetry axes (if present) of the linear birefringence. Under the influence of a constant elliptical birefringence $\vec{\omega}$, any input SOP is reproduced at the output of the fiber if its length is $L = 2\pi \sqrt{\beta_L^2 + \beta_C^2}$ or a multiple thereof, so that the evolution goes through an integral number of revolutions.

When a birefringent fiber is twisted, the evolution $\vec{C}(z)$ is complicated by the fact that the rotation vector $\vec{\omega}(z)$ is not constant but is itself moving on the Poincare sphere. If a uniform twist γ is applied to a fiber of initially uniform linear birefringence $\beta_L$, the azimuth of this linear birefringence becomes $\Phi_B = \gamma \cdot z$, and the twist-induced circular birefringence is given by Eqs. (16). Consequently, $\vec{\omega}(z)$ moves along a parallel circle on the sphere, and the trajectories became cycloidical curves, as illustrated in FIG. 4(d).

To understand these trajectories, the motion of $\vec{\omega}(z)$ can be expressed by the vector product:

$$\vec{\omega}'(z) = 2 \cdot \vec{\gamma} \times \vec{\omega}(z) \tag{18}$$

The twist vector $\vec{\gamma}$ has the magnitude γ and is directed parallel to the RL axis. For a right-handed twist is pointing north. For each cross section of the fiber, an auxiliary, local coordinate system is introduced R° whose axes x° and y° are parallel to the local fast and slow axes of birefringence, respectively, while z°=z. Hence, this system R° revolves about the fiber axis at the rate of the twist. Associated with R° there is a Poincare sphere S°, rotating about RL at the rate 2γ relative to the laboratory-fixed sphere considered so far. All quantities referring to R° and S° are marked by a superscript degree sign. Thus, the vectors $\vec{\beta}_L°$ and $\vec{\beta}_C° = \vec{\beta}_C$ are constant, with $\vec{\beta}_L°$ pointing along the x° direction. Moreover, $\vec{\omega}° = \vec{\beta}_L° + \vec{\beta}_C°$ is constant.

The evolution of $\vec{C}°(z)$ on S° is a uniform rotation with the angular velocity vector:

$$\vec{\Omega}° = \vec{\beta}_L° + \vec{\beta}_C° - 2 \cdot \vec{\gamma} \tag{19}$$

$$\Omega° = |\vec{\Omega}°| = \sqrt{(\beta_L°)^2 + (\beta_C° - 2\gamma)^2} \tag{20}$$

This vector $\vec{\Omega}°$ is fixed on S°, and all trajectories $\vec{C}°(z)$ are circles on S° about $\vec{\Omega}°$ as axis. This evolution can be recognized by regarding the two states $\pm \vec{C}_\Omega°$ which lie on S° in the fixed directions $\pm \vec{\Omega}°$:

$$\vec{C}_{\Omega°} = \vec{\Omega}°/\Omega° \tag{21}$$

These states propagate unchanged in R°, because these states read $\vec{C}_\Omega = (\vec{\omega} - 2 \cdot \vec{\gamma})/\Omega$ when expressed in R. They are simultaneous solutions of Eqs. (10) and (21). Hence, $\pm \vec{C}_\Omega°$ are the eigenstates of polarization in the twisted system R°. All other states revolve about the axis connecting $+\vec{C}_\Omega°$ and $-\vec{C}_\Omega°$, because the angular distance $[\vec{C}°, \vec{C}_\Omega°]$ of any general state $\vec{C}°$ from $\vec{C}_\Omega°$ must be conserved during the evolution. The mentioned rotation is the only motion conserving this distance generally for all points.

The trajectories $\vec{C}(z)$ can be determined by the fixed S. A general vector $\vec{C}(z)$ moves along a cone of constant semiaperture $[\vec{C}°(z), \vec{C}_\Omega°] = [\vec{C}(z), \vec{C}_\Omega]$ with angular velocity $\vec{\Omega}$, while the axis of that cone is moving along a parallel circle (dashed line in FIG. 4(d)) of latitude:

$$2 \cdot \Psi_\Omega = \arctan[(\beta_C - 2\gamma)/\beta_L] \tag{22}$$

Therefore, $\vec{C}(z)$ is generally a cycloid on S and is characterized by equal excursions to the north and south of the mean latitude $2 \cdot \Psi_\Omega$. The cycloid originating from an input state $\vec{C}(0)$ may be looping ($\vec{C}_1$ in FIG. 4(d)) or may be stretched ($\vec{C}_2$ in FIG. 4(d)), depending on whether the distance of $\vec{C}(0)$ from the local axis $\vec{C}_\Omega(0)$ is larger or less than the distance of $\vec{\omega}(0)$ from the axis $\vec{C}_\Omega(0)$, respectively.

Corresponding points on successive periods of the cycloid are spaced $2 \cdot \pi/\Omega$ apart on the fiber, equivalent to one full revolution of S°. Relative to the local axes H° and V° of the fiber, such successive states are equal. In the laboratory coordinate system, however, the second state is rotated by $2 \cdot \pi/\Omega$ with respect to the first one, just like the fiber. When γ/Ω is a rational number, the $\vec{C}(z)$ are closed curves.

The cycloidal evolution in the limits of weak and strong twists is described below. The twist is weak when $|\gamma| \ll |\beta_L|$. Then also $|\beta_C| \ll |\beta_L|$, and $\vec{\omega}° \cong \vec{\beta}_L°$, so that the evolution in S° remains practically unaffected by the twist. Therefore, the polarization is rotated as if it were rigidly attached to the fiber. This limit is realized in the polarization maintaining (PM) fiber, whose operation is based on its particularly large linear birefringence $\beta_L$. The limit of weak twist corresponds to the situation in a birefringent crystal with weak optical activity. As is well known, that activity is generally completely quenched by the linear birefringence.

A condition of strong twist exists if $|\beta_C| \gg |\beta_L|$ so that $2 \cdot \Psi_\Omega \to \pi/2$. Eq. (19) can be used to obtain $\vec{\Omega}° \cong \vec{\beta}_C - 2 \cdot \vec{\gamma} = (g-2) \cdot \vec{\gamma}$. In S° the evolution therefore approaches a uniform rotation about the polar axis at the rate $(\beta_C - 2 \cdot \gamma)$. Correspondingly, on the laboratory fixed sphere S, the SOPs rotate at the rate $\beta_C = g \cdot \gamma$. In real space, the plane of polarization rotates at half that rate. Under this limit, the linear birefringence is quenched by the twist-induced circular birefringence. A circular input state will remain circular even in the presence of weak linear birefringence ($|\beta_L| \ll |\beta_C|$). Hence, a strongly twisted fiber is polarization-maintaining for circular polarization in the same sense as the abovementioned fiber for linear polarization.

Shape Sensing

Here a simple and efficient technique capable of precise shape sensing is described. The technique is based on SOP evolution analysis in a single- or multi-core fiber having ordinary and/or PM SMFs using coherent optical time-domain reflectometry (OTDR) or optical frequency-domain reflectometry (OFDR). Bending stresses induce linear birefringence while twisting introduces circular birefringence. As such, different SOP evolutions occur on the Poincare sphere. Circular birefringence and linear birefringence exhibit a small temperature dependence; moreover complete characterization (discrimination of strain and temperature) of PM fiber is possible. The technique has a distinctly higher signal-to-noise ratio (SNR) compared with Rayleigh amplitude-based OFDR. Thus, the described method is able to provide precise distributed measurements of twist in a single-core sensor and bending and twist in a multi-core optical fiber (minimum two cores are required) and can be implemented facilitate shape sensor manufacturing and interrogation.

Single-Core Fiber Sensor

Figure 7:
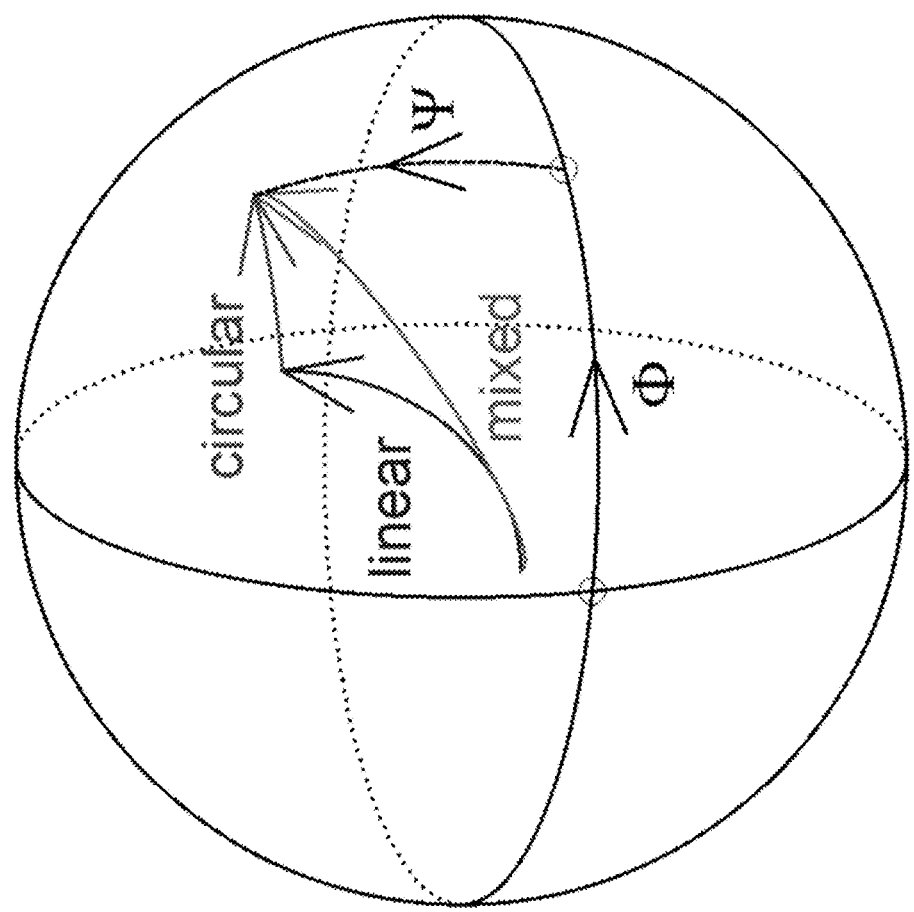
FIG. 7 illustrates an evolution of the state of polarization (SOP) as a sum of linear and circular birefringence vectors in case of strong twist and infinitesimal Δl in the example of the twisted optical fiber in FIG. 6.

A single-core fiber sensor can be constructed based on the assumption of infinitesimal axial step $\Delta l$ (i.e., spatial resolution is high); therefore changes in SOP can be considered discrete and point-wise rather than an integral over the length of $\Delta l$. In such a design, the SOP evolution vector can be broken down to sum of linear and circular birefringence vectors, as shown in FIG. 7. Since the changes of $\Psi$ are purely dictated by the linear birefringence vector, which causes SOP evolution through circular arc curve; a circular birefringence vector can be determined by the subtraction of the found linear birefringence vector from SOP evolution vector.

If linear and circular birefringence are discriminated, than in Mueller matrix formalism, the total retardance matrix $M_R$ can be represented as the combination of linear $M_L$ and circular $M_C$ retardance matrices:

and for the case of local twist and bend measurements with gradually changing bending radii and known initial curvature.

Multi-Core Fiber Sensor

Figure 8:
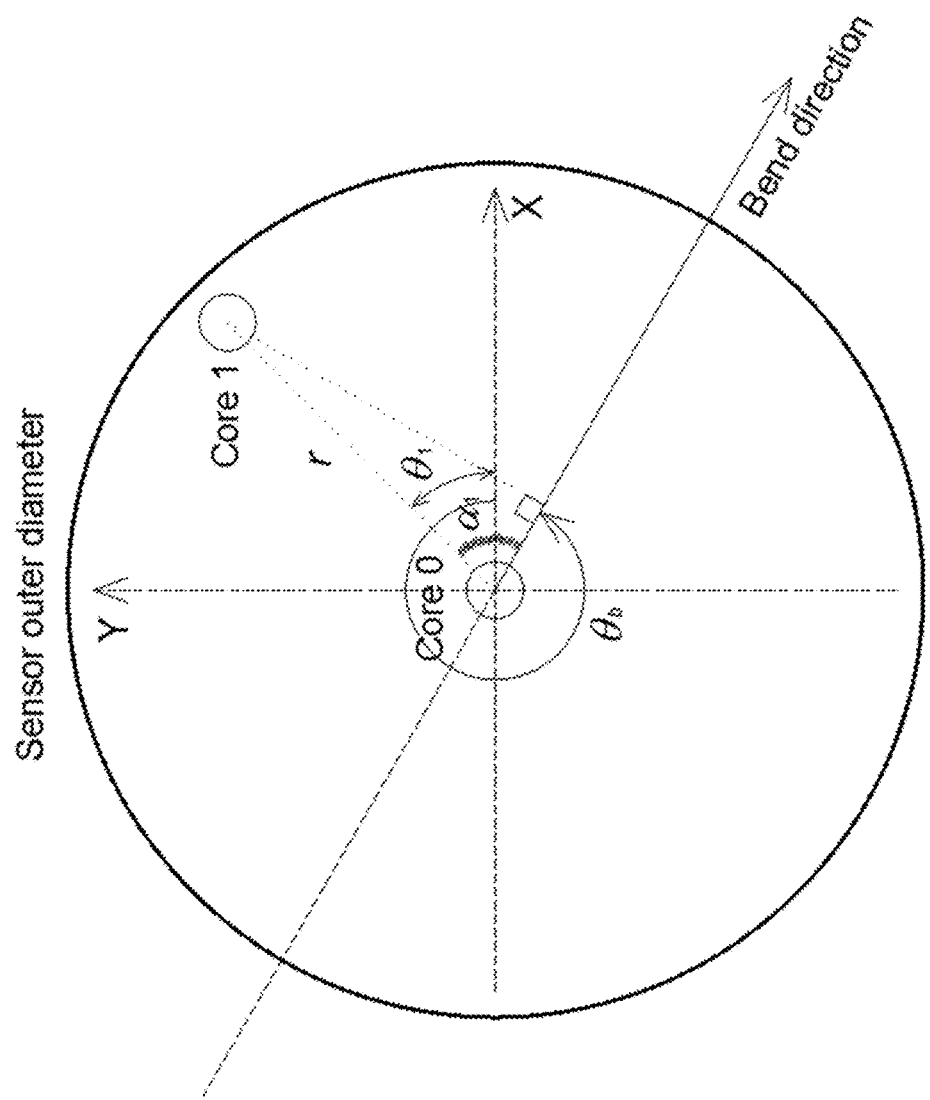
FIGS. 8, 9 and 10 show examples of the fiber cross-section used for a shape sensor with a central fiber core and one or more additional off-center fiber cores.

A shape fiber sensor using multi-core optical fiber with several birefringence sensing cores is described below. The sensor includes at least two cores, one central core (core 0) and one outer core (core 1), as shown in FIG. 8. The fiber cores 0 and 1 are embedded in a fiber cladding material as shown and the central core (core 0) is located at the center of the multi-core fiber and the outer core (core 1) is located off the center. In implementations, the number of outer cores can be more than 1, up to desired number of outer cores. A fiber with two or more cores is a multi-core fiber (MCF) and various techniques can be used to construct a fiber with two or more fiber cores. See, for example, "Manufacturing and characterization of multicore fibers" by Bourhis et al. in 1997 IWCS International Wires & Cable Symposium Proceedings at 584-589.

Figure 9:
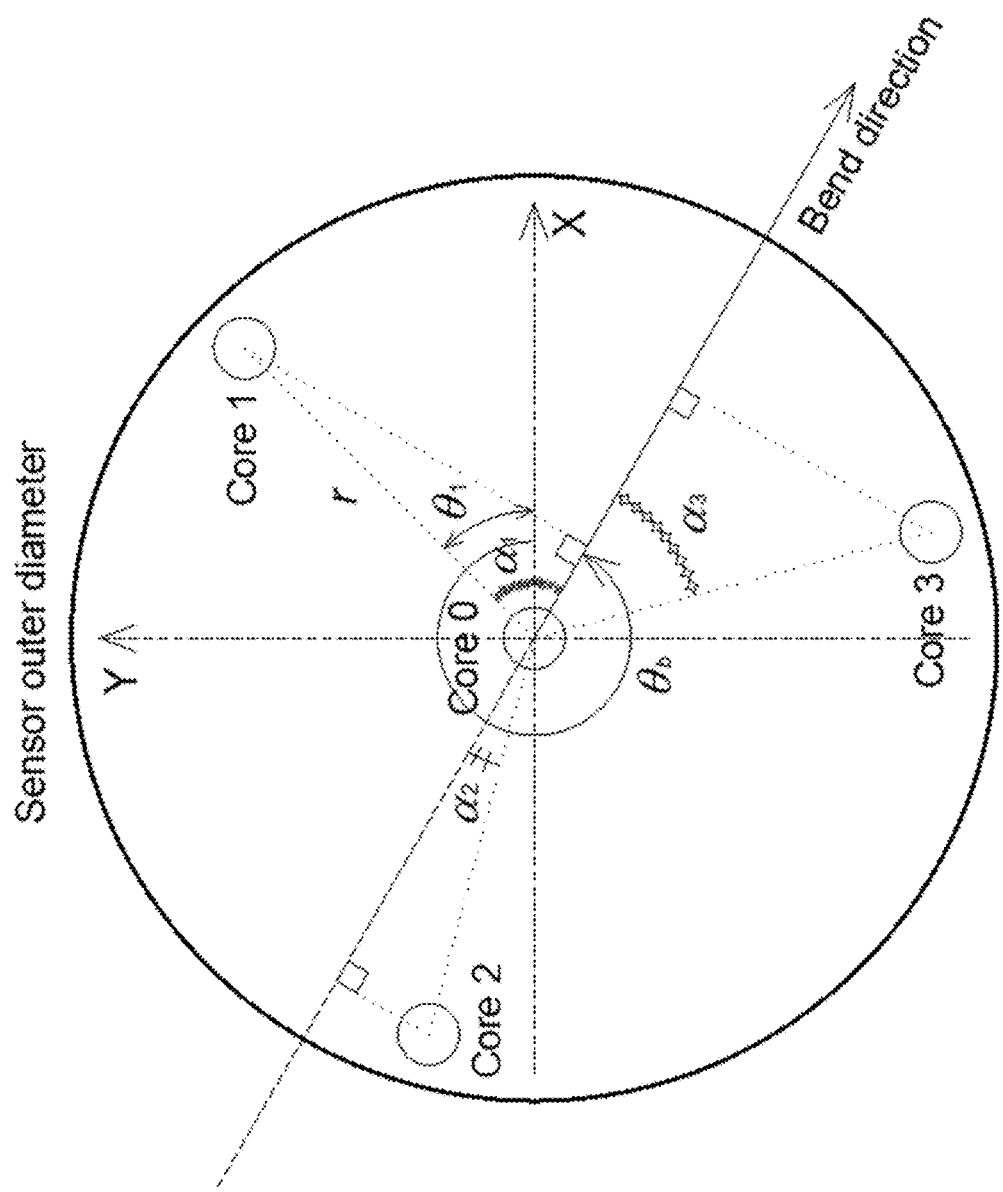

FIG. 9 shows an example of a 4-core sensor in which the three cores, core 1 to core 3, provide information on the linear birefringence caused by bending, and a fourth central core (core 0) provides the information on the circular birefringence caused by fiber twist. The locations of the cores in the cross section of the fiber are defined by a radial offset from the center r, and an angular separation of $2 \cdot \pi/3$ with $\theta_1$ representing the offset of core 1 from the $\theta=0$ axis. The orientation of the cores relative to the material frame of the fiber is set by $\theta_1$ and is assumed to be constant throughout the fiber. The value of $\theta_1$ is typically set using the simple calibration method of bending the fiber in a known single plane, measuring the bending-induced birefringence in the cores, and determining the value based on the measured birefringence values and knowledge of the bending plane. Although the circular birefringence and linear birefringence exhibit minor temperature sensitivity, the temperature dependence can be neglected in the following data analysis without significantly compromising the accuracy of the sensing.

According to Eq. (14) local linear birefringence caused by bending is inversely proportional to the square of curvature $$M_R = M_L \cdot M_C \qquad (23)$$

$$= \begin{pmatrix} 1 & 0 & 0 & 0 \\ 0 & \cos^2(2 \cdot \theta_p) + \sin^2(2 \cdot \theta_p) \cdot \sin\beta_L & \sin(2 \cdot \theta_p) \cdot \cos(2 \cdot \theta_p) \cdot (1 - \cos\beta_L) & -\sin(2 \cdot \theta_p) \cdot \sin\beta_L \\ 0 & \sin(2 \cdot \theta_p) \cdot \cos(2 \cdot \theta_p) \cdot (1 - \cos\beta_L) & \sin^2(2 \cdot \theta_p) + \cos^2(2 \cdot \theta_p) \cdot \cos\beta_L & \cos(2 \cdot \theta_p) \cdot \sin\beta_L \\ 0 & \sin(2 \cdot \theta_p) \cdot \sin\beta_L & -\cos(2 \cdot \theta_p) \cdot \sin\beta_L & \cos\beta_L \end{pmatrix} \cdot \begin{pmatrix} 1 & 0 & 0 & 0 \\ 0 & \cos(2 \cdot \beta_C) & \sin(2 \cdot \beta_C) & 0 \\ 0 & -\sin(2 \cdot \beta_C) & \cos(2 \cdot \beta_C) & 0 \\ 0 & 0 & 0 & 1 \end{pmatrix},$$

where $\theta_p$ is the orientation angle of the fast axis of linear retarder with respect to the horizontal axis, $\beta_L$ and $\beta_C$ are the magnitudes of linear and circular retardances, respectively. Based on Eqs. (14) and (16), the circular birefringence can change its sign based on the direction of the fiber twist, while the sign of the linear birefringence is constant. Since the fast axis of the linear (bending) birefringence coincides with the radius of curvature, $\theta_p$ will be different for concave or convex bending having phase shift of $\pi$, i.e., $\theta_p$ and $\pi+\theta_p$, respectively. However, since Mueller matrix for linear retardance operates with doubled orientation angle, resulting linear retardance matrices will be identical for both types of bending. Because there is an uncertainty for bending direction (orientation angle can be either $\theta_p$ or $\pi+\theta_p$), this technique can be applied for twist sensing only (no bend)

radius, R. If the twist is assumed to be negligible ($|\gamma| \ll |\beta_L|$), and the curvature is assumed to be centered in the point of origin (core 0), then the responses of the cores will be:

$$\beta_L^0 = \frac{B_0}{R^2} \qquad (24)$$

$$\beta_L^1 = \frac{B_1}{(R + r \cdot \cos\alpha_1)^2} \qquad (25)$$

$$= \frac{B_1}{(R + r \cdot \cos(2 \cdot \pi + \theta_1 - \theta_b))^2}$$

$$= \frac{B_1}{(R + r \cdot \cos(\theta_b - \theta_1))^2}$$

-continued $$\beta_L^2 = \frac{B_2}{(R - r \cdot \cos\alpha_2)^2} \qquad (26)$$

$$= \frac{B_2}{\left(R - r \cdot \cos\left(\frac{5}{3} \cdot \pi + \theta_1 - \theta_b\right)\right)^2}$$

$$= \frac{B_2}{\left(R - r \cdot \cos\left(\frac{\pi}{3} + \theta_b - \theta_1\right)\right)^2}$$

$$\beta_L^3 = \frac{B_3}{(R + r \cdot \cos\alpha_3)^2} \qquad (27)$$

$$= \frac{B_2}{\left(R + r \cdot \cos\left(\frac{2}{3} \cdot \pi + \alpha_1\right)\right)^2}$$

$$= \frac{B_2}{\left(R + r \cdot \cos\left(\frac{2}{3} \cdot \pi + \theta_b - \theta_1\right)\right)^2},$$

where $B_0$, $B_1$, $B_2$, $B_3$ are the bending calibration constants of interrogated cores. As it is mentioned before, the orientation of the cores relative to the material frame of the fiber is identified after the calibration, therefore $\theta_1$ is a known constant. Hence, Eqs. (25)-(27) can be simplified further:

$$\beta_L^1 = \frac{B_1}{(R + r \cdot \cos\delta\theta)^2} \qquad (28)$$

$$\beta_L^2 = \frac{B_2}{\left(R - r \cdot \left(\frac{\sqrt{3}}{2} \cdot \cos\delta\theta + \frac{1}{2} \cdot \sin\delta\theta\right)\right)^2} \qquad (29)$$

$$\beta_L^3 = \frac{B_2}{\left(R + r \cdot \left(\frac{\sqrt{3}}{2} \cdot \cos\delta\theta - \frac{1}{2} \cdot \sin\delta\theta\right)\right)^2}, \qquad (30)$$

where $\delta\theta = \theta_b - \theta_1$. The above questions have several redundant solutions, e.g., $$R = \sqrt{\frac{B_0}{\beta_L^0}} \quad \& \quad \theta_b = \theta_1 + \arccos\left(\frac{\sqrt{\frac{B_1}{\beta_L^1}} - \sqrt{\frac{B_0}{\beta_L^0}}}{r}\right).$$

This local linear birefringence will result in general input state rotation through the angle $\beta_L$ ($2 \cdot \beta_L$ in case of double-pass for reflectometry measurements) about $\vec{\beta}_L$ on the Poincare sphere S. In case of a single-core shape sensor, the bending magnitude and associated curvature can be found from Eqs. (23) and (24), respectively; and the bending direction can be found from analysis of linear retardance matrix $M_L$ in Eq. (23). However, the uncertainty exits for the bending angle measurement, i.e., identical linear retardation matrices for $\theta_p$ and $\pi+\theta_p$ bending angle.

In designing such a multi-core fiber sensor, the radial offset and angular separations of outer (non-central) cores can vary from core to core in some implementations. To perform the sensor calibration, at least two cores (core location does not matter) can be used to provide the information about the linear birefringence in case of negligible twist. Moreover, the cores of such a sensor can be manufactured by using various fiber materials, including, e.g., commercial or common SMF, or polarization-maintaining (PM) SMF (such as Panda, Bow-tie, and Elliptical-clad PM-SMF fibers).

In some applications, the twist may be superimposed on the existing fiber bending. Under such a condition, the magnitude of the resultant birefringence in the sensor can be expressed as $\beta = \sqrt{\beta_L^2 + (\beta_C - 2\cdot\gamma)^2}$ which reflects contributions from the linear birefringence $\beta_L$, the twist rate $\gamma$, and the rotation coefficient g. In order to achieve maximum sensitivity to the twist, one of the cores can be centered in the fiber and have small intrinsic linear birefringence (e.g., not PM SMF). In illustrated example (see FIG. 9), the core 0 is located at the center of the fiber sensor and serves as the twist-sensing core. As a result, the central core 0 senses both local linear and local circular birefringence, which causes input state rotation through the angle $\beta_L \sim 1/R^2$ ($2 \cdot \beta_L$ in case of double-pass for reflectometry measurements) about $\vec{\beta}_L$ along with the shift by $\beta_C = g \cdot \gamma$ ($2 \cdot \beta_C$ in case of double-pass for reflectometry measurements) parallel to the equator on Poincare sphere S. If the linear birefringence caused by fiber bending is known from the outer core measurements obtained from cores 1, 2 and 3, the circular birefringence in the central core 0 caused by the twist can be determined in such a multi-core sensor. When using a single-core shape sensor, the twist can be found directly from the analysis of circular retardance matrix $M_C$ in Eq. (23) using Eq. (16).

Outer cores of a multi-core sensor may be much less sensitive to the induced twist than the central core so that the aforementioned case of strong linear birefringence and quenched circular birefringence can be achieved. Thus, discriminated twist and bending sensing can be done if the central core is made of ordinary SMF (which senses both bending and twist) and one or more outer core(s) made of ordinary SMF or PM SMF. However, if the twist is significant, there are several ways to discriminate the twist from the bending, as described below.

High Resolution Technique for Sensing Significant Twist

A multi-core sensor for sensing significant twist can be structured similar to the multi-core sensor for sensing slight twist illustrated in FIG. 8. The number of outer cores can be more than one, up to desired number of outer cores. Additionally, similar to a single-core fiber sensor, axial step $\Delta l$ is assumed to be infinitesimal (i.e., spatial resolution is high); and changes in SOP are considered to be discrete and point-wise. The SOP evolution vector in such a multi-core sensor can be broken down to a sum of linear and circular birefringence vectors, as illustrated in FIG. 7. If linear and circular birefringence are known, corresponding bending and twist can be determined.

Figure 10:
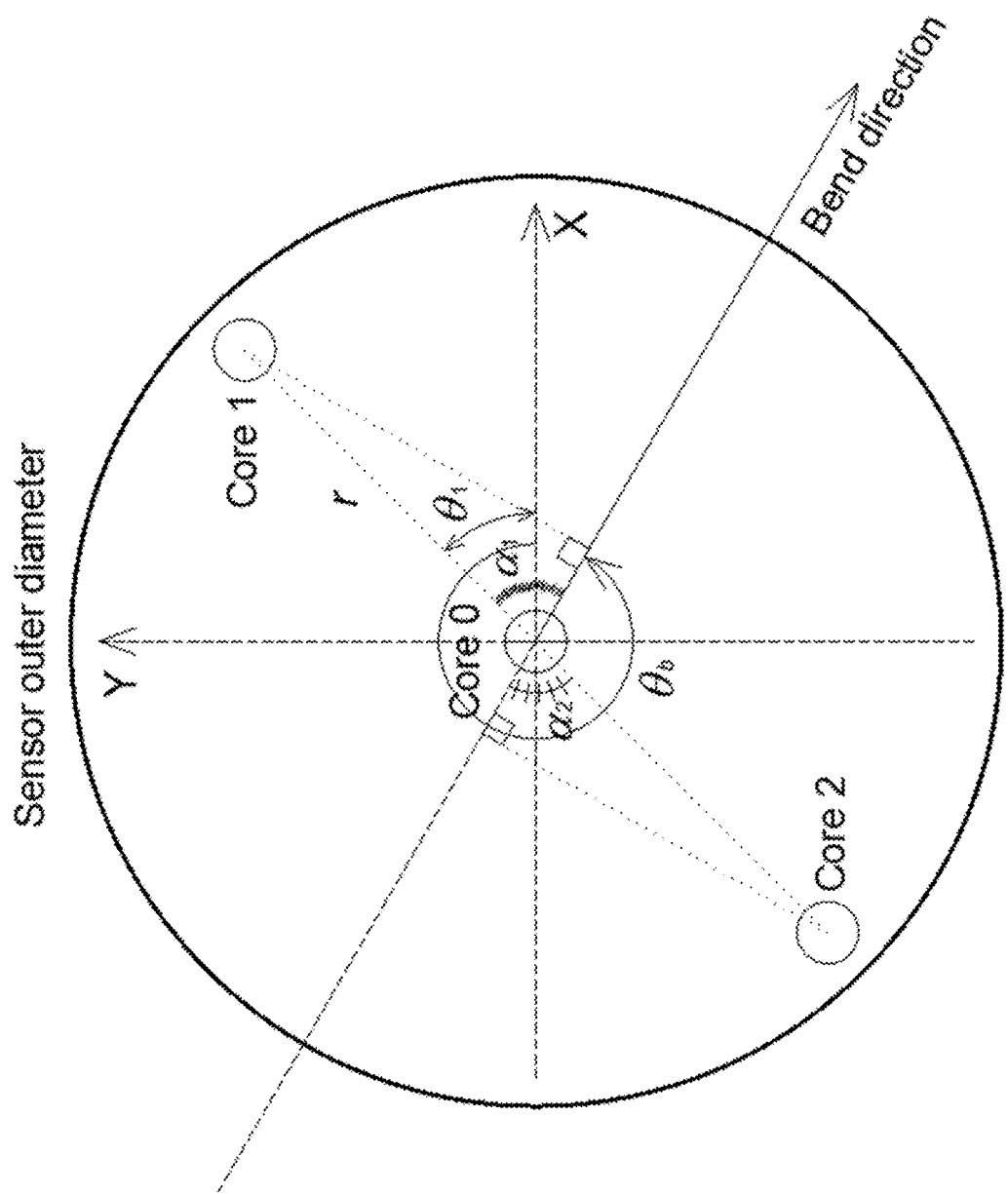

In designing a multi-core sensor for sensing significant twist, the twist in outer core can be compensated by the addition of reference outer core(s) symmetrically positioned around central core 0 with respect to the main outer core 1, e.g., reference core 2 and reference core 3 with respect to main core 1, as shown in FIG. 9. The basic configuration of the sensor has one central core and at least two outer cores and is represented in FIG. 10. The number of outer cores can be more than two, up to desired number of outer cores.

If the induced twist is assumed identical for the main (core 1 in FIG. 10) and reference (core 2 in FIG. 10) outer cores, linear birefringence can be easily obtained by offsetting of the input states for all outer cores on the same shift parallel to the equator on Poincare sphere S. For example, for a basic configuration with a single reference outer core 2 with the location specified in FIG. 10, Eq. (26) takes the following form:

$$\beta_L^2 = \frac{B_2}{(R - r \cdot \cos\alpha_2)^2} \quad (31)$$

$$= \frac{B_2}{(R - r \cdot \cos\alpha_1)^2}$$

$$= \frac{B_1}{(R - r \cdot \cos(2 \cdot \pi + \theta_1 - \theta_b))^2}$$

$$= \frac{B_1}{(R - r \cdot \cos(\theta_b - \theta_1))^2}$$

The two outer cores 1 and 2 in FIG. 10 are designed to compensate the circular birefringence caused by the twist in outer cores 1 and 2, where the linear birefringence can be calculated using previously introduced Eqs. (24)-(27). If the linear birefringence and bending calibration constant for central core 0 are known, the circular birefringence can be discriminated from the linear birefringence and accordingly the twist experienced by the central core 0 can be obtained.

Interrogation System Design Examples

In some implementations, a shape sensor interrogator includes a reflectometer, two circulators (e.g., ferrite or nonferrite circulator), a polarizer-analyzer pair in the probe path, optical switch, and shape sensing fiber. Two specific examples are shown in FIG. 11 and FIG. 12.

Figure 11:
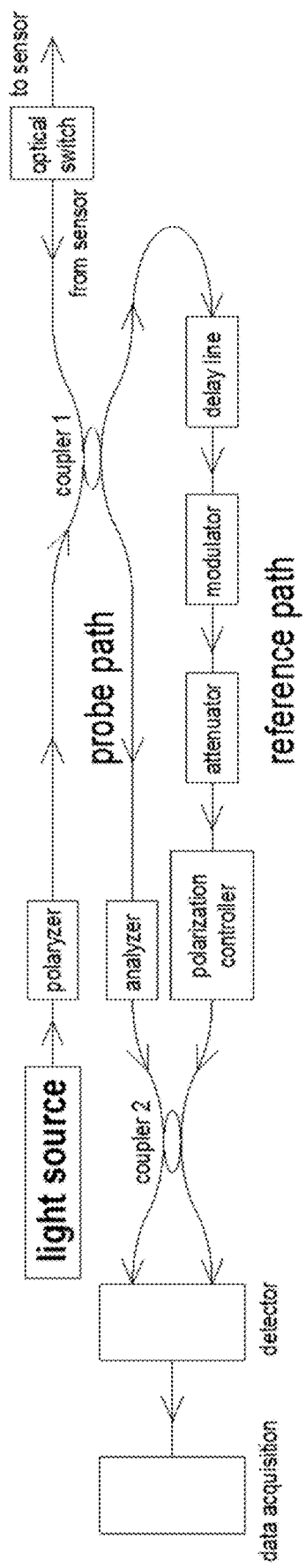
FIGS. 11, 12 and 13 show three examples of a shape sensor based on optical interferometry.

Referring to the example in FIG. 11, a polarized light beam is directed to a fiber coupler 1 which splits the polarized probe light into two light beams: (1) a probe light beam to the fiber sensor via an optical switch and (2) a reference light beam in a reference path. A source light module can be used to produce the polarized light beam, e.g., a laser that produces polarized laser light or a light source with a downstream optical polarizer. The back scattered and back reflected probe light from the fiber sensor constitutes returned probe light which returns to and is coupled by the coupler Tinto a probe path that includes an analyzer. The reference path includes an optical delay line, an optical modulator, an optical attenuator, and an optical polarization controller and the reference light beam is directed through this path to a second fiber coupler 2 that is coupled to both the probe path and the reference path to receive and mix the back scattered and back reflected probe light beam from the probe path and the reference light beam from the reference path to produce two output beams. An optical detector is coupled to the receive the two output beams from the coupler 2.

Figure 13:
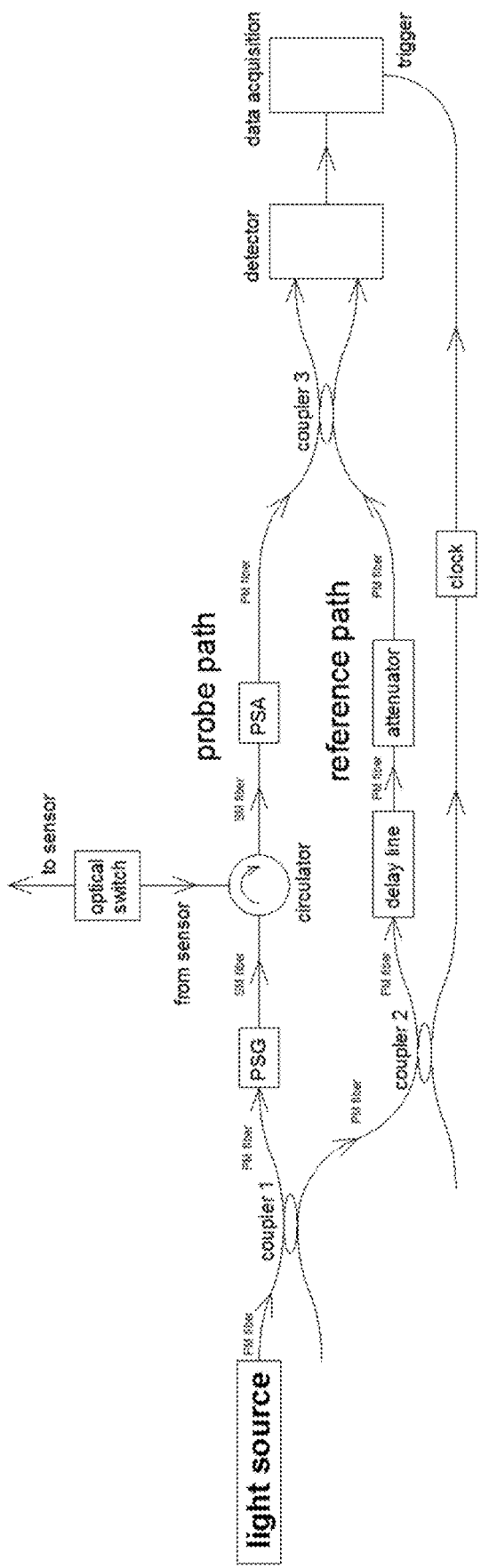

FIG. 13 shows another example of an optical fiber reflectometer with circulator. Those are examples of devices for performing birefringence measurements for shape sensing by using a birefringence discrimination technique or a reconstruction algorithm. The example in FIG. 13 uses an optical circulator for routing polarized probe light to the fiber sensor and to receive the back scattered and back reflected probe light from the sensor and a portion of the probe light to generate a clock signal as a trigger for data acquisition.

Figure 12:
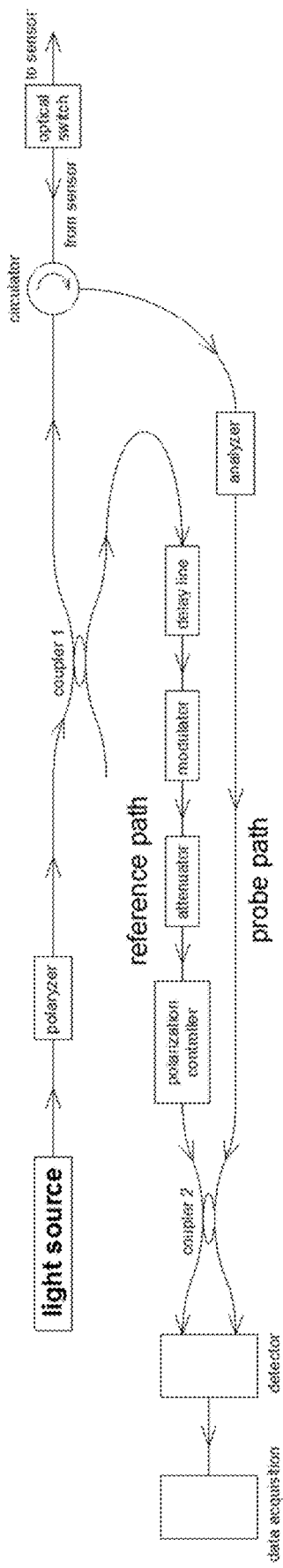

In the devices in FIGS. 11-13, the sensing fiber can be a single-core shape sensor or a multi-core shape sensor with two or more cores manufactured from ordinary or PM SMF.

A polarizer-analyzer pair can be structured to include two linear polarizers (e.g., wire-grid, absorptive, beam-splitting, reflection, birefringent, or thin film polarizers), which can be tuned (rotated) manually or using the motorized fixture. In other implementations, the polarizer may be replaced with a polarization state generator (PSG), e.g., based on magneto-optical polarization generation PSG product from General Photonics Corporation (Chino, Calif.).

In the devices in FIGS. 11 and 12, an optical switch is used for selecting a particular interrogated optical core of the fiber sensor to receive the probe light from the coupler 1. This optical switch may be implemented in various configurations, including a mechanical switch for physically shifting an optical fiber to drive one or more alternative fibers, an optical switch based on an electro-optic effect, a magneto-optic effect, or other switching mechanisms.

The reflectometer may be implemented by an amplitude splitting interferometer (e.g., Michelson or Mach-Zehnder interferometer) with example of optical fiber interferometer with and without circulator shown in FIG. 11, and FIG. 12 and FIG. 13, respectively. The back scattered and back reflected probe light from the fiber sensor in the probe path and the reference light in the reference path are coupled to spatially overlap and optically interfere with each other (coupler 2 in FIGS. 11 and 12 and coupler 3 in FIG. 13) for detection.

Depending on the type of reflectometry, the light source can be different. If the coherent optical time-domain reflectometry (OTDR) is chosen, the light source is a broad spectrum source (e.g., superluminescent diode, white light, or ultrafast laser, which can be fiber, solid state, or gas laser, etc.). If the optical frequency-domain reflectometry (OFDR) is chosen, the light source can be a coherent light source or a tunable light source with a narrow linewidth (e.g., tunable diode laser). The radiation from the light source is coupled in two paths (i.e., the probe path coupled to the fiber sensor and the reference path) by a fiber optic coupler to form the two interfering optical paths for the interferometry operation. The radiation is polarized before the coupler 1 in examples illustrated in FIG. 11 and FIG. 12, and is polarized after the coupler in FIG. 13. The radiation in probe path is directed in a blocking circulator (e.g., ferrite or nonferrite circulator) in the schematics of reflectometer with a circulator, which blocks back scattered and back reflected radiation from entering the laser (see FIG. 12 and FIG. 13). After the circulator the probing radiation is directed to the polarizer/analyzer circulator. In case of a simpler reflectometer without the blocking circulator, the probing radiation is directed to the polarizer/analyzer circulator after the fiber optic coupler 1, as illustrated in FIG. 11.

The radiation in the reference path in FIGS. 11-13 propagates through the series of optical elements, which can be arbitrary sequenced. In examples above, the radiation propagates into the modulator through the delay line, which can be motorized or manually tuned, and comprise of moving reflectors or media with controlled thickness or refractive index through shift (e.g., wedge or material with gradually changing refractive index), or density changes (e.g., mechanical stress), temperature changes (e.g., thermomechanical effect), or free carrier density changes (e.g., electrical or optical injection), etc. The delay line allows the path matching for coherent OTDR and OFDR, and provides probe path scanning in coherent OTDR.

The optical modulator in the reference path can be a phase shifter/modulator (e.g., electro-optic modulator that can be also used as a polarization modulator) or frequency shifter/modulator (e.g., acousto-optic modulator or moving reflector providing Doppler shift and based on microelectromechanical systems (MEMS), nanoelectromechanical systems (NEMS), piezoelectricity (e.g., PZT), or electrostiction/magnetostriction effect), etc. The modulator provides additional control over the radiation in OFDR and frequency shift/modulation in coherent OTDR. After the modulator, the reference path radiation is directed into an optical attenuator.

The optical attenuator is manually tuned or motorized; fixed, step-wise variable, and continuously variable optical element, which can reduce the power of radiation by such means as absorption, reflection, diffusion, scattering, deflection, diffraction, or dispersion, etc. the attenuator provides an adjustment to the power of radiation in the reference path. After the attenuator, the radiation is directed to a polarization controller.

The polarization controller can be operated without feedback, typically by manual adjustment or by electrical signals from a generator, or with automatic feedback. Such a polarization controller can be obtained by placing on the optical path three rotatable waveplates in cascade: a first quarterwave plate, which is oriented to transform the incident elliptical polarization into linear polarization, a half-wave plate, which transforms this linear polarization into another linear polarization, and a second quarterwave plate, which transforms the other linear polarization into the desired elliptical output polarization. Polarization controllers can also be implemented in an all-fiber solution. In that case, the polarization of light is changed through the application of a controlled stress to the fiber itself. For polarization controllers with automatic feedback, integrated optical lithium niobate (LiNbO$_3$) devices can be utilized. The polarization controller is required to match the polarization of radiation on reference and probe paths to produce desired interference.

In the probe path in FIGS. 11-13, the probe radiation passes through an optical switch, which controls the input/output of the sensing cores and provides sequential interrogation of all sensing cores. Back scattered and back reflected probe radiation is directed through blocking circulator (see FIG. 12 and FIG. 13) or fiber optic coupler 1 (see FIG. 11) into the analyzer followed by the next fiber optic coupler, where it is mixed with the reference path radiation for the interferometry operation. In example illustrated in FIG. 13 the analyzer is replaced with polarization state analyzer (PSA) based on magneto-optical polarization analysis, e.g., PSGA-101 [30] or PSY-201 products from General Photonics Corporation (Chino, Calif.).

The mixed radiation out of the interferometer is directed into the detector (e.g., optical, light, imaging, or photon sensor, etc.), where it is converted in the electric signal. Detector output is connected to the data acquisition device (e.g., oscilloscope, multimeter, ADC, DAQ card, PCI card, etc.) which allows the analysis of registered signal. In OFDR version of configuration illustrated in FIG. 13 the data acquisition is timed using a frequency clock, e.g., Mach-Zehnder interferometer.

The performance of the sensor examples in FIGS. 11-13 can be estimated. As the first step, the limitations and resolution of the proposed technique can be estimated. The aforementioned Eq. (14) for linear birefringence dependence on the curvature is valid in case of weak curvature, $K \cdot r \ll 1$; e.g., $R \approx 100 \cdot r \gg r$. If the fiber diameter is assumed to be 200 μm, curvature with radius R can be detected if R is larger than $\approx 10$ mm. It has to be noted that with proper calibration taking into account the effects of stronger curvature, the detection of curvature with smaller R is possible.

Further analysis of linear birefringence dependence on the curvature and circular birefringence on the twist reveals more information. If axial step Δl is small, according to Eq. (14) the integral/total linear birefringence of fiber length Δl (double-pass for reflectometry measurements has to be taken into account) can be calculated as:

$$\hat{\beta}_L[\text{rad}] = 2 \cdot \Delta l[\text{m}] \cdot \beta_L[\text{rad/m}] \quad (32)$$
$$= 0.5 \cdot \Delta l \cdot k \cdot n_0^3 \cdot (p_{11} - p_{12}) \cdot (1 + v) \cdot r^2 / R^2$$
$$= \pi \cdot n_0^3 \cdot (p_{11} - p_{12}) \cdot (1 + v) \cdot \Delta l \cdot \frac{1}{\lambda} \cdot \frac{r^2}{R^2} \approx$$
$$\approx -1.716 \cdot \Delta l \cdot \frac{1}{\lambda} \cdot \frac{r^2}{R^2}$$

Additionally, if the aforementioned fiber diameter is 200 μm and radiation in C-band range is used, e.g., $\lambda \approx 4.55$ Eq. (32) can be simplified further to:

$$\hat{\beta}_L[\text{rad}] \approx -11.071[\text{rad} \cdot \text{mm}] \cdot \frac{\Delta l[\text{mm}]}{R^2[\text{mm}^2]} \quad (33)$$

On the other hand, if axial step Δl is small, according to Eq. (16) the integral/total circular birefringence of fiber length Δl (double-pass for reflectometry measurements has to be taken into account) can be calculated as:

$$\hat{\beta}_C[\text{rad}] = 2\Delta l[m]\beta_C[\text{rad}/m] =$$
$$2 \cdot g \cdot \Delta l[m] \cdot \gamma[\text{rad}/m] \approx 2.92 \cdot 10^{-4} \cdot \Delta l[\text{mm}] \cdot \gamma[\text{rad}/m] \quad (34)$$

As it can be observed, both the linear birefringence and circular birefringence are directly proportional to the axial step Δl. The circular birefringence is also directly proportional to the twist rate, while the linear birefringence is inversely proportional to the square of bending radius. In order to register SOP evolution, i.e., changes in the linear and circular birefringence, $\hat{\beta}_L$ and $\hat{\beta}_C$ should exceed the interrogation system resolution δβ. In order to estimate the sensitivity of the technique, Eqs. (33) and (34) can be rewritten as:

$$R[\text{mm}] \leq R_{max} \equiv \sqrt{1716[\text{rad}] \cdot r^2[\text{mm}^2] \cdot \frac{1}{\lambda[\mu m]} \cdot \frac{\Delta l[\text{mm}]}{\delta\beta[\text{rad}]}} \quad (35)$$
$$\approx \sqrt{11.071[\text{rad} \cdot \text{mm}] \cdot \frac{\Delta l[\text{mm}]}{\delta\beta[\text{rad}]}}$$

$$\gamma[\text{rad}/m] \geq \gamma_{min} \equiv \frac{500 \cdot \delta\beta[\text{rad}]}{g \cdot \Delta l[\text{mm}]} \approx \frac{3424 \cdot \delta\beta[\text{rad}]}{\Delta l[\text{mm}]} \quad (36)$$

It can be noticed, that increase of the axial step Δl results in an square root increase of the curvature radius' upper limit and direct reduction of twist rate lower limit. The twist is directly proportional to the system resolution, i.e., registered twist is discrete with uniform resolution $\gamma_{min}$. For example, registered twist will be discretized as $\gamma_{min}, 2 \cdot \gamma_{min}, \ldots, n \cdot \gamma_{min}$. For bending, the situation is different. Here, registered bending is also discrete, but not uniform. The resolution is enhanced as $$\frac{1}{\sqrt{n}} - \frac{1}{\sqrt{n+1}}$$

function, i.e., registered bending is discretized as $R_{max}$, $R_{max}/\sqrt{2}, \ldots, R_{max}/\sqrt{n}$. This nonlinear sensitivity of linear birefringence to the bending is particularly useful for detection of small curvature radii. For example, if commercially available PSY-201 system is used with 0.25° (0.004 rad) uncertainty and high resolution technique is used with infinitesimal $\Delta l$, e.g., 100 μm, the upper limit for curvature radius is ~17 mm, while the lower limit for twist rate is ~137 rad/m. Thus, this technique is relatively sensitive to bending and only very strong twist. However, lower twist rates and larger curvature radii can be detected with better system resolution $\delta\beta$ or if fiber material has smaller rotation coefficient g and bigger difference in strain-optical coefficients $p_{11}$-$p_{12}$. On the other hand, if axial step $\Delta l$ is 10 mm and twist compensation technique is used, the upper limit for curvature radius is ~166 mm, while the lower limit for twist rate is ~1.37 rad/m. The sampling rate of PSY-201 is 4.0 M SOP samples/s. If 2.5 m shape sensor is used with 100 μm axial step (or resolution) $\Delta l$, the update rate for a single sensing core can be as high as 160 Hz. With axial step of 10 mm maximum update rate of single sensing core is 16 kHz.

The disclosed fiber sensor technology can be implemented in ways that provide superior performance in update rates, limits of applicability, and sensitivity (especially for small curvature radii). Moreover, complex behavior of measured values provides great opportunity to identify the best shape sensor design, optical fiber parameters, and twist compensation technique for selected application.

Calibration, Measurement, and Shape Reconstruction Procedures

Calibration

The calibration procedure of the disclosed fiber shape sensor can include the following steps.

Calibration step 1. Fiber interrogation in undisturbed (no bending or twist) state. This allows to account for intrinsic fiber twist or bending and perform precise measurements.

Calibration step 2. Calibration for bending sensitivity. An important factor that in every measurement $\theta_1$=const is assumed. In this step, the sensor is spooled on several bobbins with different curvature (e.g., bobbins with three or more different radii: $\delta\theta$=const and R is changing from case to case). After this the procedure is repeated with different sensor angular alignments (e.g., three or more different initial angular alignments of the sensor: R=const and $\delta\theta$ is changing from case to case). Thus, R=const, $\theta_1$=const, and $\theta_b$=const in a single measurement. An important note is that the twist of the sensor has to be avoided so the bending calibration is not compromised. After the calibration, bending calibration constants $B_i$ (see Eqs. (24)-(27)) are identified along with offset angle $\theta_1$ of core 1.

Calibration step 3. Calibration for twist sensitivity. An important factor that in every measurement $\theta_1$=const is assumed. In this procedure the fiber is twisted around the fiber axis with several different rates (e.g., three or more twist rates); and fiber bending is avoided. An observation is made if the outer fibers are susceptible to induced twist; and the procedure for input state offset is implemented if required. Twist calibration constant for the central core is obtained.

Measurements and Shape Reconstruction Algorithm

After the calibration is performed, the measurement procedure and reconstruction algorithm are performed for shape sensing.

Measurement Procedure

Measurement step 1. The fiber is divided in N segments with an axial step of $\Delta l_n$. Hence, the total fiber length $$l = \sum_{n=1}^{N} \Delta l_n.$$

It has to be mentioned that the axial step does not have to be uniform; and the fiber length for current fiber section can be calculated as $l_n = l_{n-1} + \Delta l_n$. Distributed measurements of SOP evolution of back scattered Rayleigh radiation are performed for every sensing core (total M sensing cores) using optical reflectometry with axial step $\Delta l_n$.

Measurement step 2. If $\Delta l_n$ increment is small, then the SOP evolution from step to step (small increment on the Poincare sphere S) can be assumed to be caused by the doubled average local or integrated birefringence (combination of linear and circular birefringence) of fiber section $\Delta l_n$. The linear and circular birefringence are obtained from every sensing core in $\Delta l_n$ increments. The values of linear and circular birefringence are appended to the $B_m$ array, where m is the number of the sensing core.

Measurement step 3. Distributed bending and twist are calculated for each fiber section with known axial position z using Eqs. (16), (23) and (24); and Eqs. (16), (24)-(27) for single- and multi-core shape sensor, respectively. The values of fiber length, i.e., distance from the fiber input, $l_n$, curvature radius $R_n$, bending angle $\theta_{bn}$, sign-sensitive twist angle $\theta_{cn}$ are appended to the data output array D, which is used as an input parameters for the following reconstruction algorithm.

Reconstruction Algorithm

The reconstruction algorithm starts from the first section closest to the sensor input. For this section $l_1$ (fiber length $\Delta l_1$) having starting point at the point of origin (0, 0, 0) found bending and twist at the section's end are used to identify the three-dimensional start position of next section $l_2$ and associated rotation of material frame of the fiber. Once the three-dimensional start position and the angular alignment of the start of the second section $l_2$ (fiber length $l_1 + \Delta l_2$) are known, the procedure is repeated to obtain the bending and twist at the end of the second section $l_2$ and identify the three-dimensional start position and associated rotation of material frame of the fiber for the start of next section $l_3$ . . . . Once the three-dimensional start position and the angular alignment of current section $l_n$ with fiber length of $l_{n-1} + \Delta l_n$, where n is the section number, are known, the procedure is repeated to obtain the bending and twist at the end of the current section $l_n$ and identify the three-dimensional start position and associated rotation of material frame of the fiber for next section $l_{n+1}$. The algorithm is repeated until the end of the shape sensor, i.e., when n=N; with the reconstructed three-dimensional curve representing current state of the fiber shape.

Implementation of Global Cartesian Coordinate System

Figure 14:
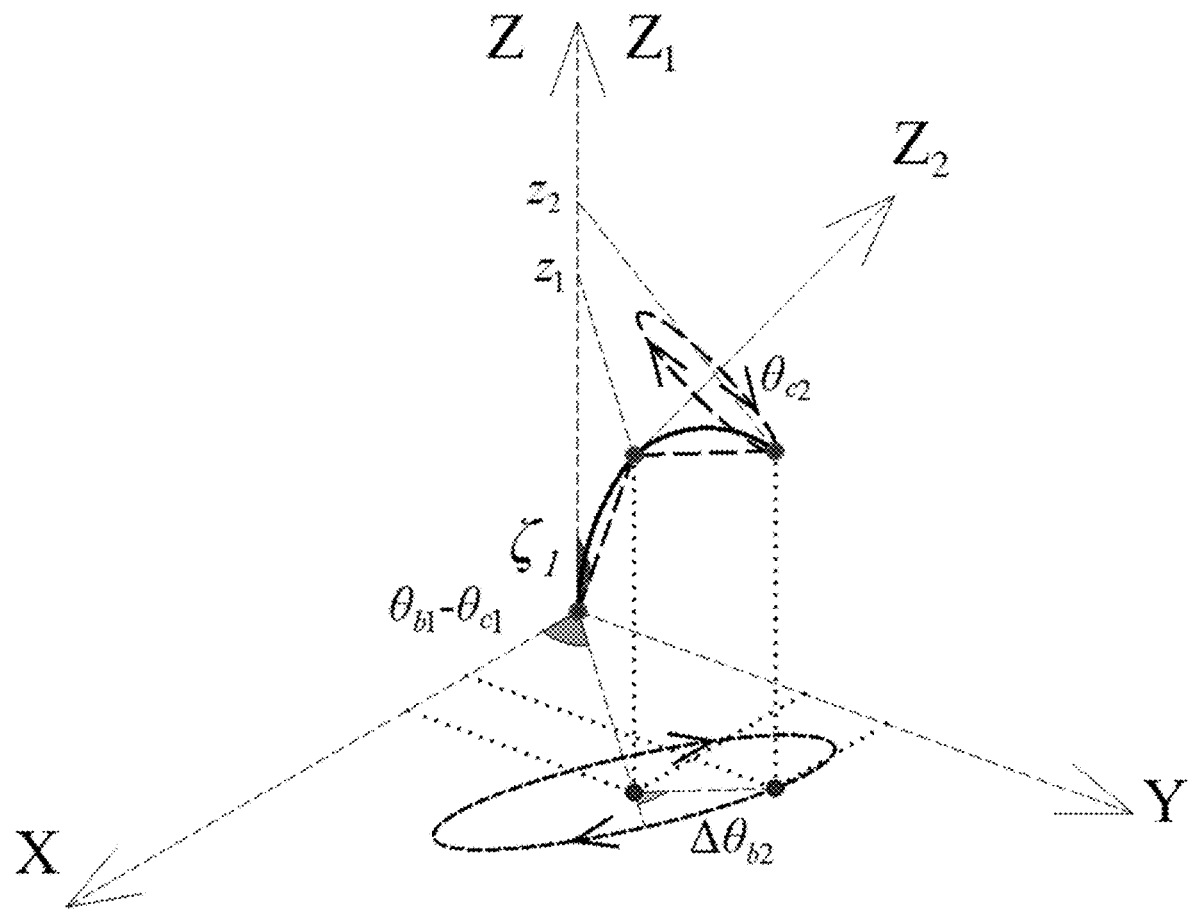
FIGS. 14, 15 and 16 show coordinates and fiber projections in signal processing for shape sensing.
Figure 15:
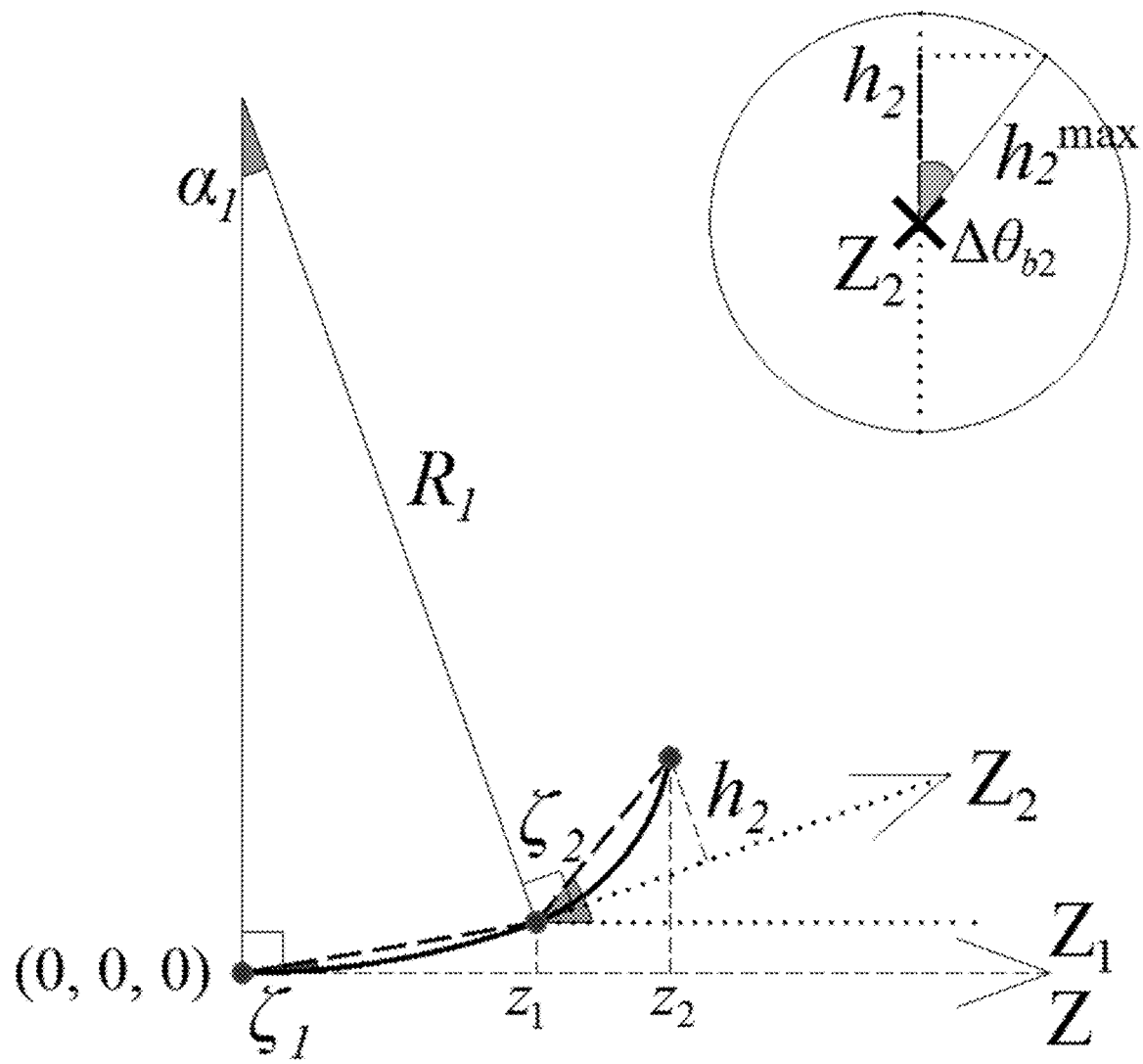
Figure 16:
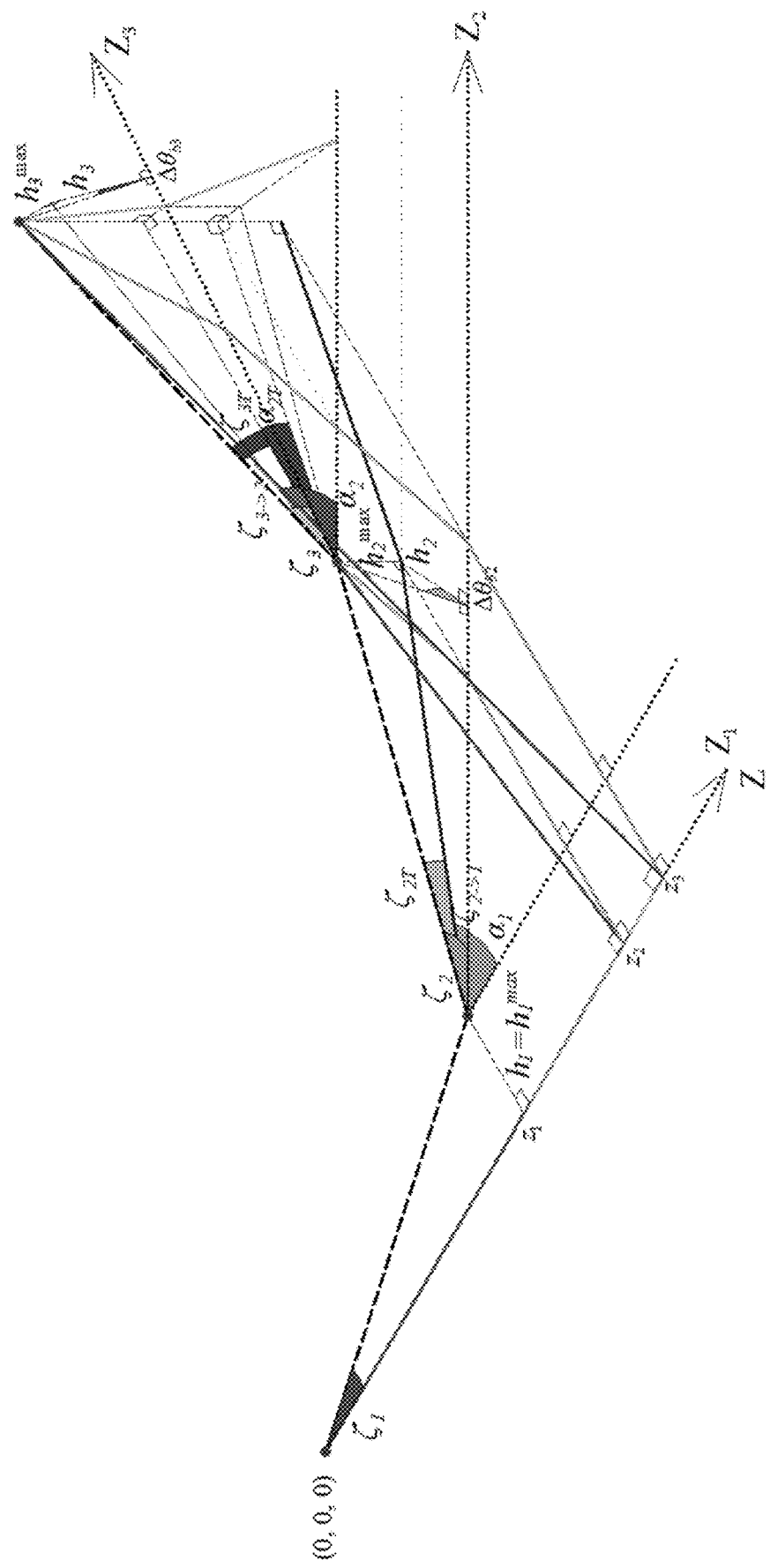

In implementing the processing of signals for the shape sensing of the disclosed fiber sensor technology, the Cartesian coordinate system may be used for various computation operations. FIG. 14 shows the three-dimensional fiber geometry and FIG. 15 shows two-dimensional fiber projection under this global Cartesian coordinate system. FIG. 16 further shows three-dimensional projections of fiber sections with corresponding angles. Bending angle $\theta_{bn}$ for each n'th axial step is measured with respect to the fiber axis X, as demonstrated in FIG. 14.

In one example, the following processing steps can be used.

Step 1 for processing under the global Cartesian coordinate system. The curvature radius $R_1$, bending angle $\theta_{b1}$, rotation angle $\theta_{c1}$ for the first point with fiber length of $\Delta l$ are retrieved from data array D (index n=1) to obtain necessary adjustments for the next point.

Step 2 for processing under the global Cartesian coordinate system. As it can be observed from FIG. 14, the $Z_1$ axis for the first iteration coincides with the global Z axis, and the fiber is located in $Z_1 Z_2$ plane. Bending of the fiber results in a small arch starting from the point of origin (0, 0, 0) and located in the plane, parallel to axis $Z_1$ and rotated by $\theta_{b1}$ angle with respect to X axis. The fiber twist introduces fiber frame rotation, which in turn alters the angle of the fiber plane with respect to XY axes. Since the positive sign of the twist indicates l-rotatory activity, positive twist will reduce the angle of the fiber plane with respect to X axis. Hence, the angle of the fiber plane with respect to X axis is $\theta_{b1}-\theta_{c1}$. It has to be noted that bending angle is not cumulative, i.e., every segment has its own bending angle $\theta_{bn}$. On the contrary, rotation angle $\theta_c$ is cumulative throughout the whole procedure.

Step 3 for processing under the global Cartesian coordinate system. Coordinates for the end of the first section are calculated below. First, as it is illustrated in FIG. 15, the chord length of the first section is $2 \cdot R_1 \cdot \sin(\alpha_1/2)$, where $\alpha_1 = \Delta l_1/R_1$ is the central angle of the first section. The angle between the chord and the $Z_1$ axis $\zeta_1$ is:

$$\zeta_1 = \alpha_1/2 = \frac{\Delta l_1}{2 \cdot R_1} \tag{37}$$

Hence, the Z coordinate of the first section end $z_1$ is:

$$z_1 = 2 \cdot R_1 \cdot \sin(\alpha_1/2) \cdot \cos\zeta_1 \tag{38}$$
$$= 2 \cdot R_1 \cdot \sin\left(\frac{\Delta l_1}{2 \cdot R_1}\right) \cdot \cos\left(\frac{\Delta l_1}{2 \cdot R_1}\right)$$
$$= R_1 \cdot \sin\left(\frac{\Delta l_1}{R_1}\right)$$

The X coordinate of the first section end $x_1$ is:

$$x_1 = 2 \cdot R_1 \cdot \sin(\alpha_1/2) \cdot \sin\zeta_1 \cdot \cos(\theta_{b1} - \theta_{c1}) \tag{39}$$
$$= 2 \cdot R_1 \cdot \sin^2\left(\frac{\Delta l_1}{2 \cdot R_1}\right) \cdot \cos(\theta_{b1} - \theta_{c1})$$

The Y coordinate of the first section end $y_1$ is:

$$y_1 = 2 \cdot R_1 \cdot \sin(\alpha_1/2) \cdot \sin\zeta_1 \cdot \sin(\theta_{b1} - \theta_{c1}) \tag{40}$$
$$= 2 \cdot R_1 \cdot \sin^2\left(\frac{\Delta l_1}{2 \cdot R_1}\right) \cdot \sin(\theta_{b1} - \theta_{c1})$$

Step 4 for processing under the global Cartesian coordinate system. The calculation of coordinates for the following sections is more complex. In order to calculate the Z coordinate, all fiber sections are sequentially projected on the plane of the first fiber section plane $(Z_1 Z_2)$. It can be observed from FIG. 16 that the Z axis of the second fiber section $Z_2$ no longer coincides with global Z axis. Instead, $Z_2$ axis is located in the plane of the first fiber section and is a tangent to the first section arch end, constituting angle $\alpha_1$ with global axis Z. The second section of the fiber is located in the $Z_2 Z_3$ plane. After the curvature radius $R_2$, bending angle $\theta_{b2}$, rotation angle $\theta_{c2}$ for the second point with fiber length of $2 \cdot \Delta l$ are retrieved from data array D (index n=2) the coordinates of the second section end can be calculated as per procedure below. If the bending angle for the second section is identical to that of the first section and there is no fiber twist, the angle between the Z and $Z_2$ axes is $\alpha_1$, and, similarly to Eq. (37), $\zeta_2$ is:

$$\zeta_2 = \alpha_2/2 = \Delta l_2/(2 \cdot R_2) \tag{41}$$

If the bending angle of the second section is different from that of the first section and/or there is a fiber twist, the arch of the second section will rotate around its axis $Z_2$, as it is illustrated in FIG. 14. The radius of the rotation is $$h_2^{max} = 2 \cdot R_2 \cdot \sin(\alpha_2/2) \cdot \sin\zeta_2 = 2 \cdot R_2 \cdot \sin^2\left(\frac{\Delta l_2}{2 \cdot R_2}\right),$$

as shown in FIG. 15. Here, the difference $\Delta\theta_{b2} = (\theta_{b2} - \theta_{c2}) - \theta_{b1}$. It has to be noted that this difference does not take into account previous fiber twist, since fiber twist is a cumulative value. If second section is projected on the first section plane, the equation for the angle $\zeta_{2 \to 1}$ is:

$$\tan\zeta_{2 \to 1} = \frac{h_2}{2 \cdot R_2 \cdot \sin(\alpha_2/2) \cdot \cos\zeta_2} \tag{42}$$
$$= \frac{h_2^{max} \cdot \cos\Delta\theta_{b2}}{2 \cdot R_2 \cdot \sin\left(\frac{\Delta l_2}{2 \cdot R_2}\right) \cdot \cos\left(\frac{\Delta l_2}{2 \cdot R_2}\right)}$$
$$= \tan\zeta_2 \cdot \cos(\theta_{b2} - \theta_{c2} - \theta_{b1})$$
$$= \tan\left(\frac{\Delta l_2}{2 \cdot R_2}\right) \cdot \cos(\theta_{b2} - \theta_{c2} - \theta_{b1})$$

If $\zeta_{2 \to 1}$ is assumed to be less than $\pi/2$, i.e., $$\cos\zeta_{2 \to 1} = \frac{1}{\sqrt{1 + \tan^2\zeta_{2 \to 1}}} \text{ and } \sin\zeta_{2 \to 1} = \frac{\tan\zeta_{2 \to 1}}{\sqrt{1 + \tan^2\zeta_{2 \to 1}}},$$

projection of the second fiber section $\Delta z_{2 \to 1}$ on $Z_1$, or global axis Z, i.e., the coordinate $z_2$ is:

$$z_2 = z_1 + \Delta z_{2 \to 1} \tag{43}$$
$$= z_1 + 2 \cdot R_2 \cdot \sin(\alpha_2/2) \cdot \frac{\cos\zeta_2}{\cos\zeta_{2 \to 1}} \cdot \cos(\alpha_1 + \zeta_{2 \to 1})$$
$$= z_1 + + 2 \cdot R_2 \cdot \sin\left(\frac{\Delta l_2}{2 \cdot R_2}\right) \cdot \cos\left(\frac{\Delta l_2}{2 \cdot R_2}\right) \cdot$$
$$\frac{(\cos\alpha_1 \cdot \cos\zeta_{2 \to 1} - \sin\alpha_1 \cdot \sin\zeta_{2 \to 1})}{\cos\zeta_{2 \to 1}} =$$
$$= z_1 + 2 \cdot R_2 \cdot \sin\left(\frac{\Delta l_2}{2 \cdot R_2}\right) \cdot \cos\left(\frac{\Delta l_2}{2 \cdot R_2}\right) \cdot$$
$$\left[\cos\left(\frac{\Delta l_1}{2 \cdot R_1}\right) - \sin\left(\frac{\Delta l_1}{2 \cdot R_1}\right) \cdot \tan\left(\frac{\Delta l_2}{2 \cdot R_2}\right) \cdot \cos(\theta_{b2} - \theta_{c2} - \theta_{b1})\right] =$$
$$= z_1 + R_2 \cdot \sin\left(\frac{\Delta l_2}{R_2}\right) \cdot$$
$$\left[\cos\left(\frac{\Delta l_1}{2 \cdot R_1}\right) - \sin\left(\frac{\Delta l_1}{2 \cdot R_1}\right) \cdot \tan\left(\frac{\Delta l_2}{2 \cdot R_2}\right) \cdot$$
$$\cos(\theta_{b2} - \theta_{c2} - \theta_{b1})]$$

From another hand the same can be calculated using the angle $\zeta_{2T}$ in the plane, orthogonal to the first fiber section plane $Z_1 Z_2$ and passing through the projection of first fiber section on $Z_1Z_2$ plane. $\zeta_{2T}$ can be found using the following equation:

$$\sin\zeta_{2T} = \sin\zeta_2 \cdot \sin\Delta\theta_{b2} = \sin\left(\frac{\Delta l_2}{2 \cdot R_2}\right) \cdot \sin(\theta_{b2} - \theta_{c2} - \theta_{b1}) \quad (44)$$

If $$\cos\zeta_{2T} = \sqrt{1 - \sin^2\zeta_{2T}}$$
$$= \sqrt{1 - (\sin\zeta_2 \cdot \sin\Delta\theta_{b2})^2}$$
$$= \sqrt{1 - \left[\sin\left(\frac{\Delta l_2}{2 \cdot R_2}\right) \cdot \sin(\theta_{b2} - \theta_{c2} - \theta_{b1})\right]^2}, z_2$$

can be calculated as:

$$z_2 = z_1 + \Delta z_{2\to1} = z_1 + 2 \cdot R_2 \cdot \sin(\alpha_2/2) \cdot \cos\zeta_{2T} \cdot \cos(\alpha_1 + \zeta_{2\to1}) = \quad (45)$$

$$z_1 + + 2 \cdot R_2 \cdot \sin\left(\frac{\Delta l_2}{2 \cdot R_2}\right) \cdot \sqrt{1 - \left[\sin\left(\frac{\Delta l_2}{2 \cdot R_2}\right) \cdot \sin(\theta_{b2} - \theta_{c2} - \theta_{b1})\right]^2} \cdot$$

$$(\cos\alpha_1 \cdot \cos\zeta_{2\to1} - \sin\alpha_1 \cdot \sin\zeta_{2\to1}) == z_1 +$$

$$2 \cdot R_2 \cdot \sin\left(\frac{\Delta l_2}{2 \cdot R_2}\right) \cdot \sqrt{1 - \left[\sin\left(\frac{\Delta l_2}{2 \cdot R_2}\right) \cdot \sin(\theta_{b2} - \theta_{c2} - \theta_{b1})\right]^2} \cdot$$

$$\left(\frac{\cos\left(\frac{\Delta l_1}{2 \cdot R_1}\right)}{\sqrt{1 + \tan^2\zeta_{2\to1}}} - \frac{\sin\left(\frac{\Delta l_1}{2 \cdot R_1}\right) \cdot \tan\zeta_{2\to1}}{\sqrt{1 + \tan^2\zeta_{2\to1}}}\right) ==$$

$$z_1 \cdot R_2 \cdot \sin\left(\frac{\Delta l_2}{2 \cdot R_2}\right) \cdot$$

$$\sqrt{\frac{1 - \left[\sin\left(\frac{\Delta l_2}{2 \cdot R_2}\right) \cdot \sin(\theta_{b2} - \theta_{c2} - \theta_{b1})\right]^2}{1 + \left[\tan\left(\frac{\Delta l_2}{2 \cdot R_2}\right) \cdot \cos(\theta_{b2} - \theta_{c2} - \theta_{b1})\right]^2}} \cdot \left[\cos\left(\frac{\Delta l_1}{2 \cdot R_1}\right) - \right.$$

$$\left. \sin\left(\frac{\Delta l_1}{2 \cdot R_1}\right) \cdot \tan\left(\frac{\Delta l_2}{2 \cdot R_2}\right) \cdot \cos(\theta_{b2} - \theta_{c2} - \theta_{b1})\right] ==$$

$$z_1 + R_2 \cdot \sin\left(\frac{\Delta l_2}{2 \cdot R_2}\right) \cdot \sqrt{\cos^2\left(\frac{\Delta l_2}{2 \cdot R_2}\right)} \cdot \left[\cos\left(\frac{\Delta l_1}{2 \cdot R_1}\right) - \right.$$

$$\left. \sin\left(\frac{\Delta l_1}{2 \cdot R_1}\right) \cdot \tan\left(\frac{\Delta l_2}{2 \cdot R_2}\right) \cdot \cos(\theta_{b2} - \theta_{c2} - \theta_{b1})\right] ==$$

$$z_1 + R_2 \cdot \sin\left(\frac{\Delta l_2}{R_2}\right) \cdot \left[\cos\left(\frac{\Delta l_1}{2 \cdot R_1}\right) - \right.$$

$$\left. \sin\left(\frac{\Delta l_1}{2 \cdot R_1}\right) \cdot \tan\left(\frac{\Delta l_2}{2 \cdot R_2}\right) \cdot \cos(\theta_{b2} - \theta_{c2} - \theta_{b1})\right]$$

It can be seen that both Eq. (43) and Eq. (45) provide the same output regardless of the chosen method. This observation can serve as cross-validation of these methods and indication of error-free calculations.

The circular rotation of second fiber section end around $Z_2$ will result in elliptical rotation on XY plane, as illustrated in FIG. 14. The semi-major axis of ellipse $a_e$ is orthogonal to $Z_1Z_2$ plane and equals $$h_2^{max} = 2 \cdot R_2 \cdot \sin^2\left(\frac{\Delta l_2}{2 \cdot R_2}\right).$$

The semi-minor axis $b_e$ is located in $Z_1Z_2$ plane and equals $$2 \cdot R_2 \cdot \sin\left(\frac{\Delta l_2}{2 \cdot R_2}\right) \cdot \cos\left(\frac{\Delta l_1}{R_1}\right).$$

In FIG. 14, the ellipse radius can be calculated using the ellipse equation:

$$r_e = \frac{a_e \cdot b_e}{\sqrt{a^2 \cdot \cos^2\Delta\theta_{b2} + b^2 \cdot \sin^2\Delta\theta_{b2}}}$$

$$= \frac{2 \cdot R_2 \cdot \sin^2\left(\frac{\Delta l_2}{2 \cdot R_2}\right) \cdot \cos\left(\frac{\Delta l_1}{R_1}\right)}{\sqrt{\sin^2\left(\frac{\Delta l_2}{2 \cdot R_2}\right) \cdot \cos^2(\theta_{b2} - \theta_{c2} - \theta_{b1}) + \cos^2\left(\frac{\Delta l_1}{R_1}\right) \cdot \sin^2(\theta_{b2} - \theta_{c2} - \theta_{b1})}}$$

Hence:

$$x_2 = x_1 + r_e \cdot \cos(\theta_{b1} - \theta_{c1} + \Delta\theta_{b2}) \quad (47)$$

$$= x_1 + \frac{2 \cdot R_2 \cdot \sin^2\left(\frac{\Delta l_2}{2 \cdot R_2}\right) \cdot \cos\left(\frac{\Delta l_1}{R_1}\right)}{\sqrt{\sin^2\left(\frac{\Delta l_2}{2 \cdot R_2}\right) \cdot \cos^2(\theta_{b2} - \theta_{c2} - \theta_{b1}) + \cos^2\left(\frac{\Delta l_1}{R_1}\right) \cdot \sin^2(\theta_{b2} - \theta_{c2} - \theta_{b1})}} \cdot$$

$$\cos(\theta_{b2} - \theta_{c1} - \theta_{c2})$$

$$y_2 = y_1 + r_e \cdot \sin(\theta_{b1} - \theta_{c1} + \Delta\theta_{b2}) \quad (48)$$

$$= x_1 + \frac{2 \cdot R_2 \cdot \sin^2\left(\frac{\Delta l_2}{2 \cdot R_2}\right) \cdot \cos\left(\frac{\Delta l_1}{R_1}\right)}{\sqrt{\sin^2\left(\frac{\Delta l_2}{2 \cdot R_2}\right) \cdot \cos^2(\theta_{b2} - \theta_{c2} - \theta_{b1}) + \cos^2\left(\frac{\Delta l_1}{R_1}\right) \cdot \sin^2(\theta_{b2} - \theta_{c2} - \theta_{b1})}} \cdot$$

$$\sin(\theta_{b2} - \theta_{c1} - \theta_{c2})$$

For the subsequent fiber sections in the fiber sensor, the coordinates can be derived in a similar pattern. The complexity of calculations drastically increases for every subsequent fiber section.

Implementation of Local Cartesian Coordinate System

An alternative approach to the above global Cartesian coordinate system is to use a local Cartesian coordinate system associated with the fiber.

In this local Cartesian coordinate system, for every iteration, the local coordinate system is shifted, inclined, and rotated according to the measured fiber coordinates, bending, and twist. Thus, every calculation is based on the Step 3 for a fiber section described above for processing under the global Cartesian coordinate system. After the end coordinates of the first section are calculated using Eqs. (38)-(40), the local coordinate system for the second section is positioned in a way that the point of origin is located at the end of the previous fiber section, Z axis is coincident with $Z_2$ axis, which has $$\alpha_1 = 2 \cdot \zeta_1 = \frac{\Delta l_1}{R_1}$$

angle with axis $Z_1$ and constitutes angle $\Xi_1$ with axis $X_1$, which can be calculated as $$\cos\Xi_1 = \sin\alpha_1 \cdot \cos(\theta_{b1} - \theta_{c1}) = \sin\left(\frac{\Delta l_1}{R_1}\right) \cdot \cos(\theta_{b1} - \theta_{c1}).$$

The $X_2Y_2$ plane is rotated counter-clockwise to the angle of $\theta_{b1}$-$\theta_{c1}$. After the end coordinates of the second section are calculated using modified Eqs. (38)-(40), the local coordinate system for the third section is positioned in a way that the point of origin is located at the end of the previous fiber section, Z axis is coincident with $Z_3$ axis, which has $$\alpha_2 = 2 \cdot \zeta_2 = \frac{\Delta l_2}{R_2}$$

angle with axis $Z_2$ and constitutes angle $\Xi_2$ with axis $X_2$, which can be calculated as $$\cos\Xi_2 = \sin\alpha_2 \cdot \cos(\theta_{b2} - \theta_{c2} - \theta_{b1}) = \sin\left(\frac{\Delta l_2}{R_2}\right) \cdot \cos(\theta_{b2} - \theta_{c2} - \theta_{b1}).$$

$X_3Y_3$ plane is rotated counter-clockwise to the angle of $\theta_{b2}$-$\theta_{c2}$-$\theta_{b1}$ .... The end coordinates of the n'th section can be calculated using ($\theta_{b0}$=0):

$$\Delta z_n = R_n \cdot \sin\left(\frac{\Delta l_n}{R_n}\right) \quad (49)$$

$$\Delta x_n = 2 \cdot R_n \cdot \sin^2\left(\frac{\Delta l_n}{2 \cdot R_n}\right) \cdot \cos(\theta_{bn} - \theta_{cn} - \theta_{b[n-1]}) \quad (50)$$

$$\Delta y_n = 2 \cdot R_n \cdot \sin^2\left(\frac{\Delta l_n}{2 \cdot R_n}\right) \cdot \sin(\theta_{bn} - \theta_{cn} - \theta_{b[n-1]}) \quad (51)$$

The local coordinate system for the (n+1)'th section is positioned in a way that the point of origin is located at the end of the previous fiber section, Z axis is coincident with $Z_{n+1}$ axis, which has the following angles $\alpha_n$ and $\Xi_n$ with axes $Z_n$ and $X_n$, respectively:

$$\alpha_n = 2 \cdot \zeta_n = \frac{\Delta l}{R_n} \text{ angle with axis } Z_n \quad (52)$$

$$\cos\Xi_n = \sin\left(\frac{\Delta l_n}{R_n}\right) \cdot \cos(\theta_{bn} - \theta_{cn} - \theta_{b[n-1]}) \text{ angle with axis } X_n \quad (53)$$

$X_{n+1}Y_{n+1}$ plane is rotated counter-clockwise to the angle $\Delta\theta_{bn}$ of:

$$\Delta\theta_{bn} = \theta_{bn} - \theta_{cn} - \theta_{b[n-1]} \quad (54)$$

The procedure is repeated until the end of the fiber. In implementations, the axial step $\Delta l_n$ may be selected for convenience and does not have to be uniform. For example, the step can vary through the fiber according to a particular application. In some cases, the axial steps can be sparse for relatively straight sections but may be selected to be dense in sections with noticeable twist or bending.

Figure 17A:
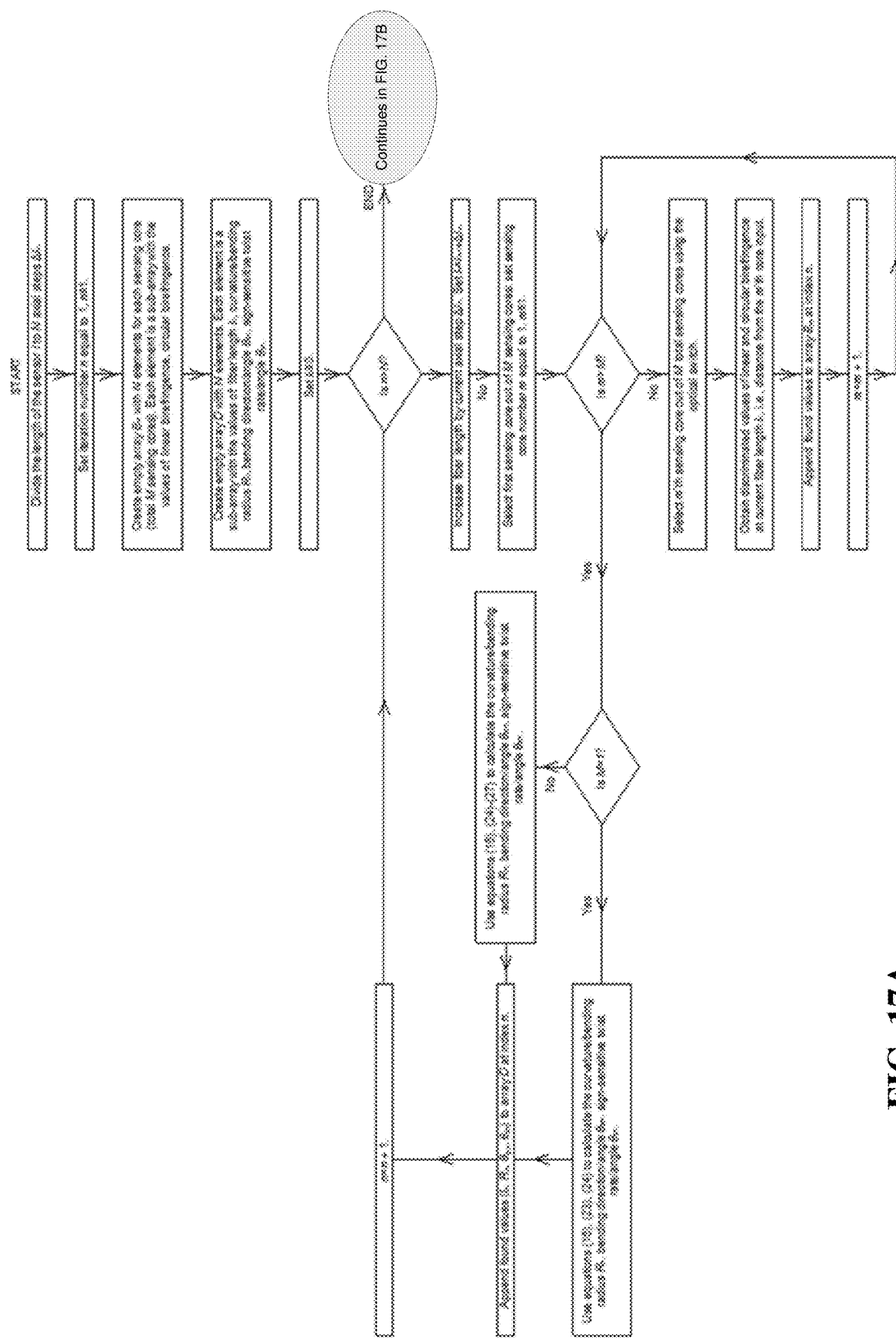
FIG. 17 includes FIGS. 17A and 17B, showing an example for implementing a fiber shape reconstruction algorithm based on the calculated fiber bending and twist from the measured linear and circular birefringence in a multi-core fiber shape sensor.
Figure 17B:
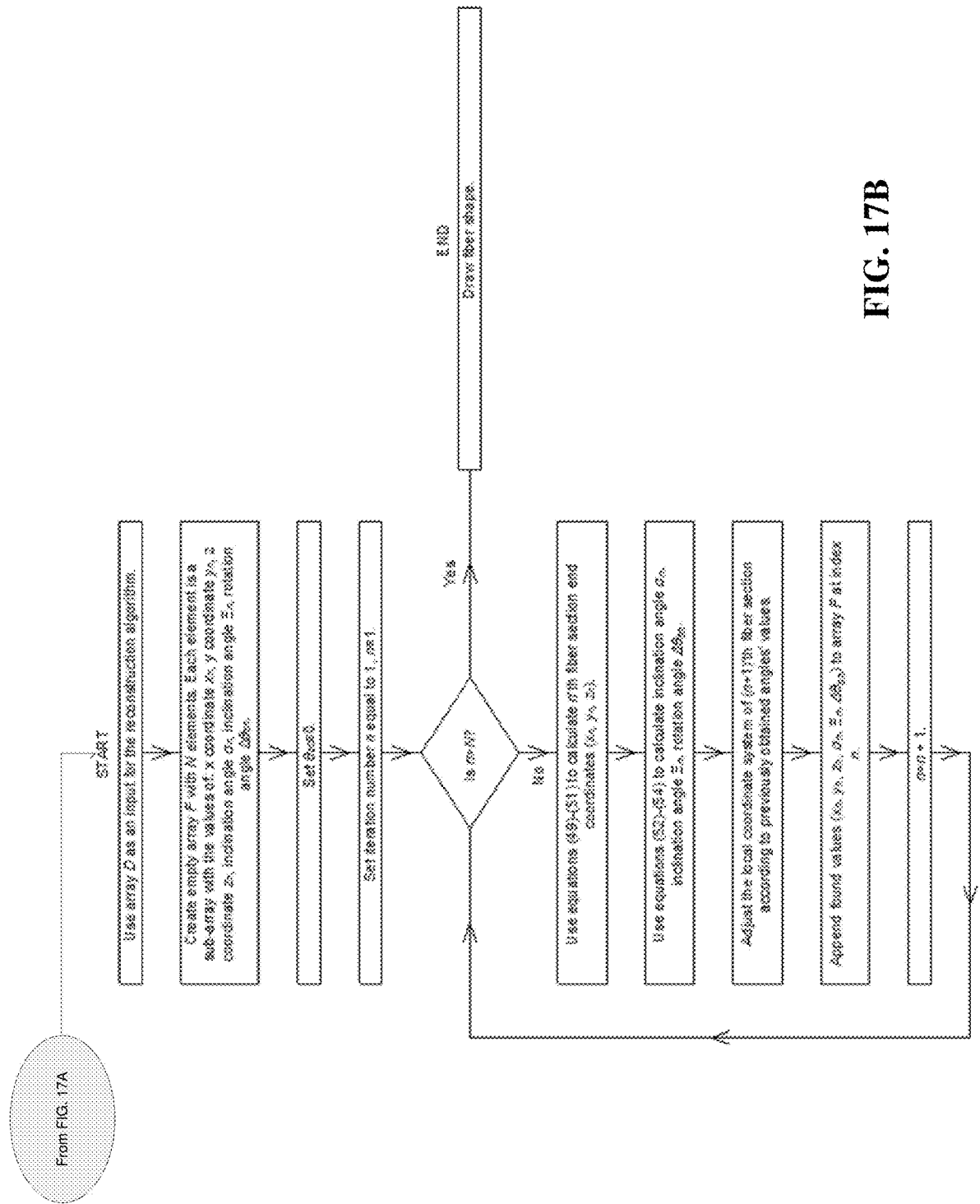

The fiber shape reconstruction algorithm based on the calculated fiber bending and twist from the measured linear and circular birefringence is illustrated in FIGS. 17A and 17B in FIG. 17.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for monitoring a shape by using a fiber sensor having different fiber cores that are displaced from one another for shape sensing, comprising:
    directing probe light sequentially into the different fiber cores in the multi-core fiber sensor, to couple the probe light into one fiber core at a time so that to couple the probe light into the different fiber cores at different time in sequence, to produce returned probe light from each of the different fiber cores of the multi-core fiber sensor;
    directing the returned probe light from each of the different fiber cores of the multi-core fiber sensor into a single optical interferometer for processing the returned probe light from all of the different fiber cores to produce an optical output for a corresponding fiber core in the multi-core fiber sensor;
    operating an optical detector to convert the optical output from the optical interferometer into an electrical signal that carries information on a local shape change at a corresponding fiber core in the multi-core fiber sensor; and
    processing the electrical signals for different corresponding fiber cores in the multi-core fiber sensor to monitor a shape-related optical polarization evolution in the returned probe light from each fiber core of the multi-core fiber sensor to determine the shape change from the electrical signals for different corresponding fiber cores in the multi-core fiber sensor,
    wherein the multi-core fiber sensor is structured so that the fiber cores are arranged to include a center fiber core located in the center of the multi-core fiber sensor and one or more off-center fiber cores away from the center fiber core in the multi-core fiber sensor, and wherein the method includes:
processing the returned probe light from the center fiber core to extract information on the twist experienced by the fiber cores; and
processing the returned probe light from the one or more off-center fiber cores to determine the bending experienced by the fiber cores.

2. The method as in claim 1, wherein:
the probe light has a broad spectrum and the processing based on coherent optical time-domain reflectometry (OTDR).

3. The method as in claim 2, comprising:
using a superluminescent diode, a white light sources, or an ultrafast laser to produce the probe light with the broad spectrum.

4. The method as in claim 1, wherein:
the probe light has a narrow linewidth and the processing is based on optical frequency-domain reflectometry (OFDR).

5. The method as in claim 4, comprising:
using a tunable continuous wave diode laser to produce the probe light with the narrow linewidth.

6. The method as in claim 1, comprising:
using an optical switch to direct the probe light into the different fiber cores in the multi-core fiber sensor, one at a time.

7. The method as in claim 1, comprising:
controlling an optical polarization of the probe light into the different fiber cores in the multi-core fiber sensor;
monitoring a polarization change in the returned probe light from each of the different fiber cores in the multi-core fiber sensor to determine a bending experienced by the fiber cores and a twist experienced by the fiber cores.

8. The method as in claim 1, wherein:
the fiber cores are arranged to include two or more off-center fiber cores away from the center fiber core in the multi-core fiber sensor, and
the two or more off-center fiber cores are arranged symmetrically positioned with respect to the center fiber core.

9. The method as in claim 1, comprising:
prior to perform shape sensing, calibrating the multi-core fiber sensor by inducing fiber bending and twisting to the fiber cores of the multi-core fiber sensor and measuring the returned probe light, wherein the calibrating includes:
maintaining the multi-core fiber sensor at an original shape without inducing any bending and twisting while directing the probe light into each of the different fiber cores of the multi-core fiber sensor to obtain first calibration electrical signals for the different fiber cores in the multi-core fiber sensor to represent an undisturbed sensor state while accounting for intrinsic fiber twist or bending;
inducing a known bending without twisting to the multi-core fiber sensor while directing the probe light into each of the different fiber cores of the multi-core fiber sensor to obtain second calibration electrical signals for the different fiber cores in the multi-core fiber sensor to represent the known bending;
inducing a known twisting without bending to the multi-core fiber sensor while directing the probe light into each of the different fiber cores of the multi-core fiber sensor to obtain third calibration electrical signals for the different fiber cores in the multi-core fiber sensor to represent the known twisting; and
using information from the first calibration electrical signals indicating the intrinsic fiber twisting or bending without any applied bending to twisting, the second calibration electrical signals indicating the known bending without twisting and the third calibration electrical signals indicating the known twisting without bending to calibrate the electrical signals obtained in measuring a shape of an object.

10. An optical multi-core fiber sensor for shape sensing, comprising:
a probe light source to produce probe light;
different fiber cores that are displaced from one another and are engaged to an object to optically sense a shape change in the object that is experienced by the different fiber cores, wherein the different fiber cores are arranged to include a center fiber core located in the center of the multi-core fiber sensor and one or more off-center fiber cores away from the center fiber core;
an optical light coupling module configured to receive the probe light from the probe light source and to sequentially direct the probe light into each of the center fiber core and the one or more off-center fiber cores of the multi-core fiber sensor, one fiber core at a time, to produce returned probe light from the different fiber cores of the multi-core fiber sensor;
an optical interferometer coupled to be shared by the center fiber core and the one or more off-center fiber cores of the multi-core fiber sensor to sequentially receive, from one fiber core at a time, the returned probe light from each of the different fiber cores of the multi-core fiber sensor to produce an optical output for a corresponding fiber core in the multi-core fiber sensor;
an optical detector coupled to receive output light from the optical interferometer and operable to convert the optical output from the optical interferometer into an electrical signal that carries information on a local change shape experienced at a corresponding fiber core in the multi-core fiber sensor; and
a sensor processor coupled to receive the electrical signals for different corresponding fiber cores in the multi-core fiber sensor from the optical detector, the sensor processor configured to process the electrical signals to monitor a shape-related optical polarization evolution in the returned probe light from each fiber core of the multi-core fiber sensor to determine the shape change from the electrical signals for different corresponding fiber cores in the multi-core fiber sensor, wherein the sensor processor processes the electrical signals obtained the returned probe light from the center fiber core to extract information on the twist experienced by the fiber cores; and processes electrical signals from the returned probe light from the one or more off-center fiber cores to determine the bending experienced by the fiber cores.

11. The sensor as in claim 10, wherein:
the probe light source is structured to produce the probe light that has a broad spectrum.

12. The sensor as in claim 11, wherein:
the probe light source includes a superluminescent diode, a white light sources, or an ultrafast laser.

13. The sensor as in claim 10, wherein:
the probe light source is structured to produce the probe light that has a narrow linewidth.

14. The sensor as in claim 13, wherein:
the probe light source includes a tunable continuous wave diode laser.

15. The sensor as in claim 10, comprising:
an optical switch coupled in an optical path between the probe light source and the different fiber cores to sequentially direct the probe light into the different fiber cores in the multi-core fiber sensor, one at a time.

16. The sensor as in claim 10, wherein:
the optical interferometer coupled to receive the returned probe light from each of the different fiber cores includes:
 a reference path coupled to receive a portion of the probe light from the probe light source without being directed to the fiber cores as a reference light beam;
 a probe path coupled to receive the returned probe light from each of the different fiber cores in the multi-core fiber sensor;
 an optical coupler coupled to both the probe path to receive the returned probe light and the reference path to receive the reference light beam and to spatially overlap the returned probe light and the received reference light beam to produce an optical interference signal as the optical output for each of the fiber cores in the multi-core fiber sensor.

17. The sensor as in claim 16, wherein the reference path includes:
 a polarization controller that controls a polarization state of the reference light beam entering the optical coupler.

18. The sensor as in claim 16, wherein the probe path includes:
 a polarization analyzer that measures a polarization state of the returned probe light.

19. The sensor as in claim 10, wherein:
the sensor processor is structured to process the electrical signals to monitor shape-related optical polarization evolutions in the returned probe light from the fiber cores to determine bending and twisting experienced by the fiber cores.

20. The sensor as in claim 19, wherein:
the sensor processor is structured to perform a signal calibration in processing the electrical signals obtained when optically sensing a shape change in the object based on information from:
 first calibration data indicating intrinsic fiber twisting or bending without any applied bending to twisting to the fiber cores, the second calibration data indicating a known bending to the fiber cores without twisting and third calibration data indicating a known twisting to the fiber cores without bending.

* * * * *